(12) United States Patent
Furuichi et al.

(10) Patent No.: US 10,917,858 B2
(45) Date of Patent: Feb. 9, 2021

(54) COMMUNICATION CONTROL APPARATUS AND WIRELESS COMMUNICATION APPARATUS

(71) Applicant: Sony Corporation, Tokyo (JP)

(72) Inventors: Sho Furuichi, Tokyo (JP); Ryo Sawai, Tokyo (JP); Ryota Kimura, Tokyo (JP); Hiromasa Uchiyama, Tokyo (JP); Takashi Usui, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/581,766

(22) Filed: Sep. 25, 2019

(65) Prior Publication Data

US 2020/0022092 A1 Jan. 16, 2020

Related U.S. Application Data

(63) Continuation of application No. 15/978,624, filed on May 14, 2018, now Pat. No. 10,448,341, which is a
(Continued)

(30) Foreign Application Priority Data

Aug. 21, 2013 (JP) .................................. 2013-171018

(51) Int. Cl.
*H04W 72/08* (2009.01)
*H04W 52/24* (2009.01)
(Continued)

(52) U.S. Cl.
CPC ........ *H04W 52/243* (2013.01); *H04B 17/373* (2015.01); *H04W 52/143* (2013.01);
(Continued)

(58) Field of Classification Search
CPC . H04B 17/345; H04B 17/373; H04W 52/143; H04W 52/228; H04W 52/243;
(Continued)

(56) References Cited

U.S. PATENT DOCUMENTS 9,338,807 B2 * 5/2016 Kwon ................. H04W 52/243
9,629,099 B2 * 4/2017 Ohbuchi ............. H04W 52/242
(Continued)

FOREIGN PATENT DOCUMENTS

CA    2845770 A1   3/2013
CN   103181205 A   6/2013
(Continued)

OTHER PUBLICATIONS

Naotaka Sato, et al., "TV White Spaces as part of the future Spectrum Landscape for Wireless Communications", ETSI Reconfigurable Radio Systems Workshop, Dec. 12, 2012, 8 pages.
(Continued)

*Primary Examiner* — Robert J Lopata
(74) *Attorney, Agent, or Firm* — Xsensus LLP

(57) ABSTRACT

[Object] To achieve both prevention of harmful interference and promptness of power allocation under conditions in which multiple secondary systems may be managed.
[Solution] Provided is a communication control apparatus including: a calculation unit configured to calculate a transmit power to be allocated, including a nominal transmit power and a margin for interference avoidance, for one or more secondary systems that secondarily use frequency channels protected for a primary system; and a determination unit configured to determine a variation in a number of secondary systems, and cause the calculation unit to adjust the margin for interference avoidance on a basis of the determined variation.

21 Claims, 19 Drawing Sheets

Related U.S. Application Data continuation of application No. 14/895,160, filed as application No. PCT/JP2014/066410 on Jun. 20, 2014, now Pat. No. 10,004,044.

(51) Int. Cl.
| | |
|---|---|
| *H04W 52/14* | (2009.01) |
| *H04W 52/34* | (2009.01) |
| *H04B 17/373* | (2015.01) |
| *H04W 52/36* | (2009.01) |
| *H04W 52/38* | (2009.01) |
| *H04W 52/22* | (2009.01) |
| *H04B 17/345* | (2015.01) |

(52) U.S. Cl.
CPC ....... *H04W 52/244* (2013.01); *H04W 52/343* (2013.01); *H04W 52/362* (2013.01); *H04W 52/386* (2013.01); *H04W 72/082* (2013.01); *H04B 17/345* (2015.01); *H04W 52/228* (2013.01)

(58) Field of Classification Search
CPC ............. H04W 52/244; H04W 52/343; H04W 52/362; H04W 52/386; H04W 72/082
USPC ........................................................ 370/329
See application file for complete search history.

(56) References Cited

U.S. PATENT DOCUMENTS

| | | | | |
|---|---|---|---|---|
| 2003/0109274 A1* | 6/2003 | Budka | ................. | H04W 52/265 455/522 |
| 2004/0022207 A1* | 2/2004 | Leung | ................. | H04W 52/24 370/321 |
| 2004/0203981 A1* | 10/2004 | Budka | ................. | H04W 52/265 455/522 |
| 2005/0099973 A1* | 5/2005 | Qiu | ................. | H04W 52/244 370/328 |
| 2010/0029319 A1* | 2/2010 | Higuchi | ................. | H04W 52/48 455/522 |
| 2010/0216472 A1* | 8/2010 | Youn | ................. | H04L 1/0003 455/436 |
| 2010/0226344 A1* | 9/2010 | Nandagopalan | .... | H04W 36/385 370/338 |
| 2011/0009141 A1* | 1/2011 | Harada | ................. | H04W 16/14 455/509 |
| 2011/0028179 A1* | 2/2011 | Sawai | ................. | H04W 52/16 455/522 |
| 2011/0028180 A1* | 2/2011 | Sawai | ................. | H04W 52/46 455/522 |
| 2011/0034204 A1* | 2/2011 | Sawai | ................. | H04W 52/243 455/522 |
| 2011/0038383 A1* | 2/2011 | Ibrahim | ................. | H04W 52/267 370/445 |
| 2012/0099450 A1* | 4/2012 | Madan | ................. | H04W 74/0816 370/252 |
| 2012/0252521 A1* | 10/2012 | Nagaraja | ................. | H04B 17/391 455/522 |
| 2013/0217429 A1* | 8/2013 | Kimura | ................. | H04W 16/14 455/509 |
| 2013/0336155 A1* | 12/2013 | Jantti | ................. | H04W 24/08 370/252 |
| 2013/0343219 A1* | 12/2013 | Kronander | ................. | H04W 52/28 370/252 |
| 2014/0094165 A1* | 4/2014 | Karlsson | ................. | H04W 16/14 455/423 |
| 2014/0206409 A1* | 7/2014 | Ohbuchi | ................. | H04W 52/245 455/522 |
| 2014/0219235 A1* | 8/2014 | Kimura | ................. | H04W 52/16 370/329 |
| 2014/0220901 A1* | 8/2014 | Selen | ................. | H04B 17/391 455/63.1 |
| 2015/0055563 A1* | 2/2015 | Zhu | ................. | H04W 52/243 370/329 |
| 2015/0156729 A1* | 6/2015 | Sawai | ................. | H04W 52/243 455/522 |
| 2015/0281972 A1* | 10/2015 | Prytz | ................. | H04W 16/14 370/329 |
| 2015/0319622 A1* | 11/2015 | Sun | ................. | H04W 16/14 455/454 |
| 2016/0006522 A1* | 1/2016 | Furuichi | ................. | H04B 15/00 370/329 |
| 2016/0073269 A1* | 3/2016 | Bajko | ................. | H04W 4/50 370/329 |
| 2016/0337983 A1 | 11/2016 | Kimura et al. | | |

FOREIGN PATENT DOCUMENTS

| | | |
|---|---|---|
| EP | 2608592 A1 | 6/2013 |
| JP | 2012-151815 A | 8/2012 |
| JP | 2013-078096 A | 4/2013 |
| WO | 2012/125088 A1 | 9/2012 |

OTHER PUBLICATIONS

"Technical and operational requirements for the operation of white space devices under geo-location approach", Electronic Communication Committee, ECC Report 186, Jan. 2013, 181 pages.

International Search Report dated Sep. 2, 2014 in PCT/JP14/66410 Filed Jun. 20, 2014.

Extended European Search Report dated Mar. 15, 2017 in Patent Application No. 14837544. 7.

Office Action and Search Report issued in Chinese Application 201480044490.3 dated Nov. 5, 2018.

\* cited by examiner

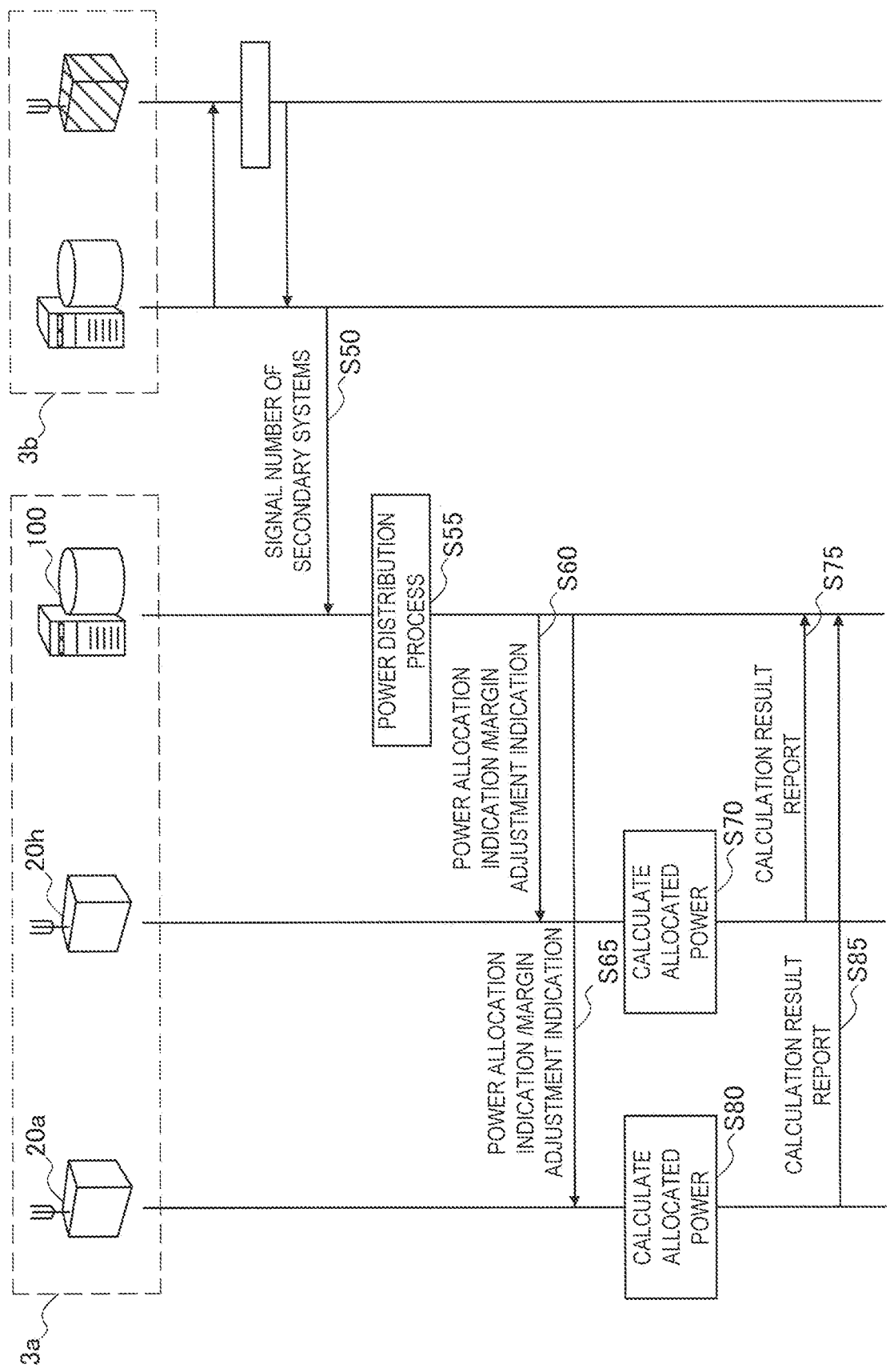

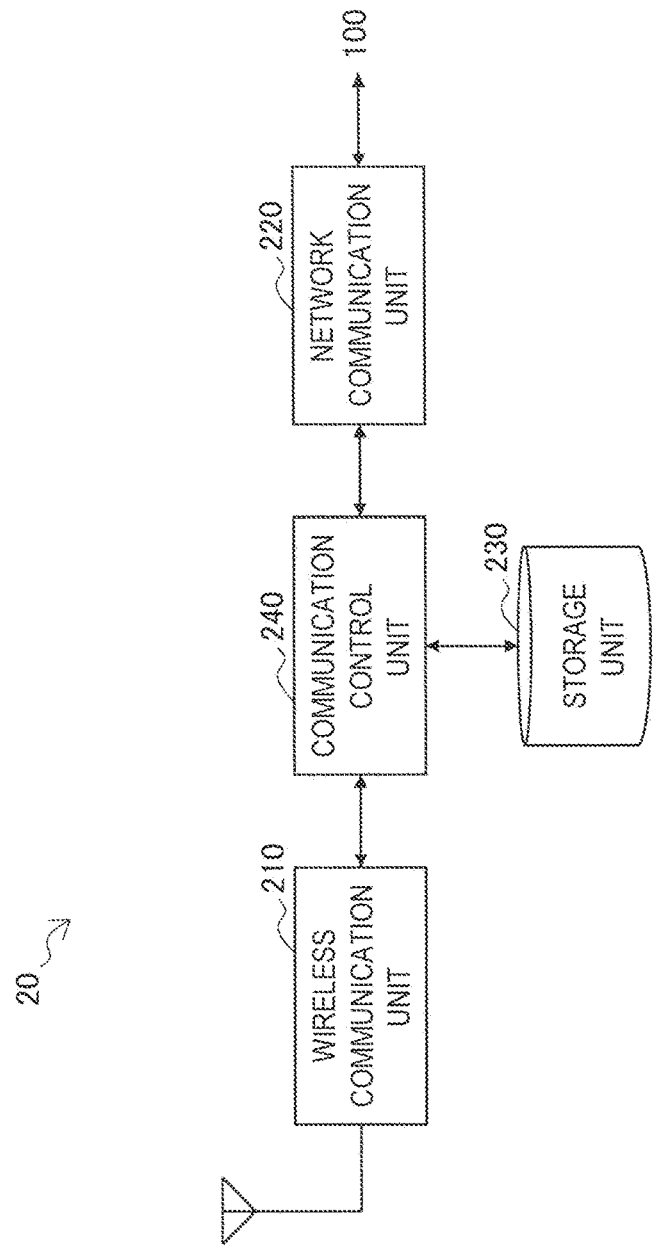

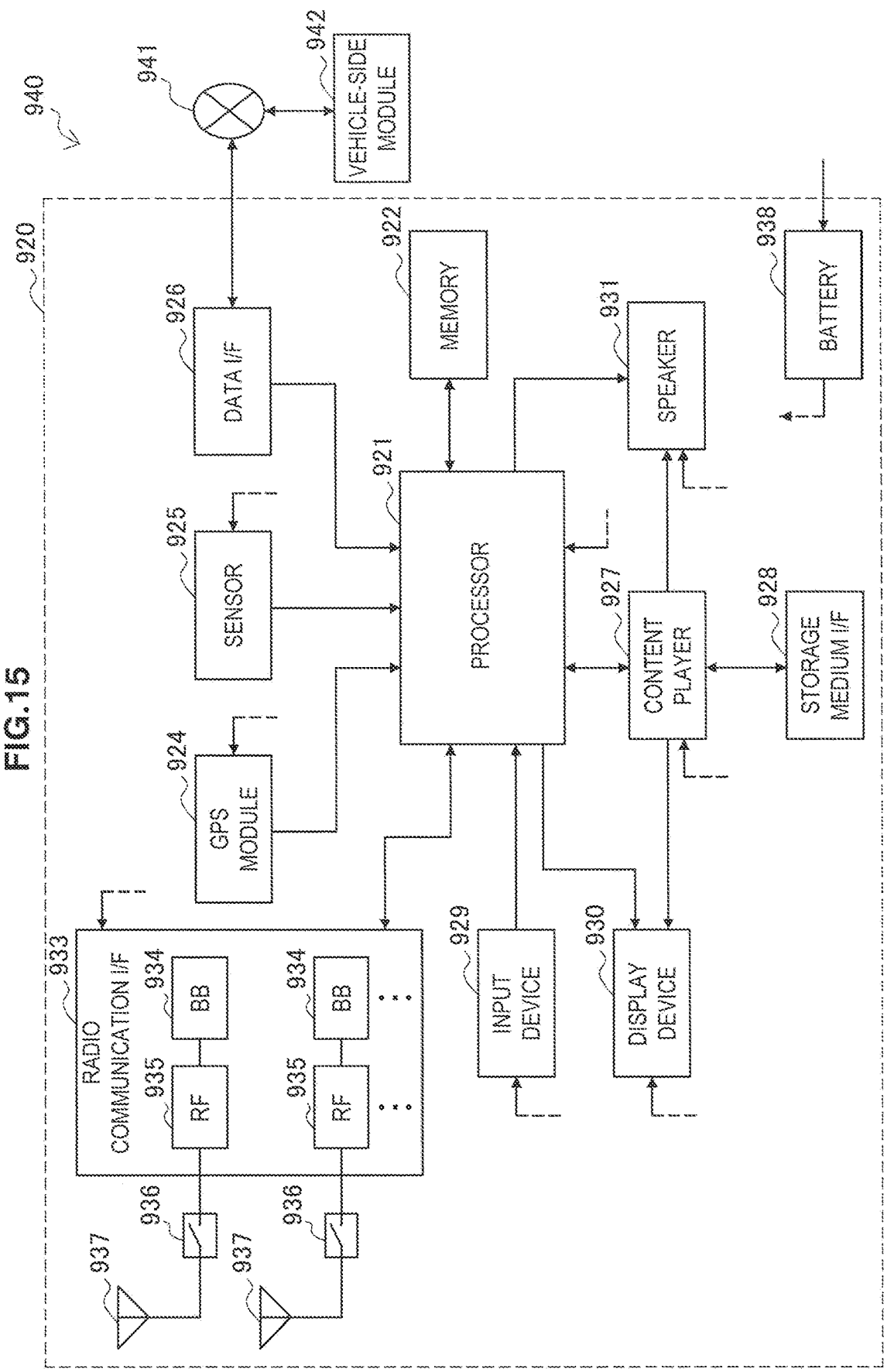

COMMUNICATION CONTROL APPARATUS AND WIRELESS COMMUNICATION APPARATUS

CROSS-REFERENCE TO RELATED APPLICATIONS

The present application is a continuation of U.S. application Ser. No. 15/978,624, filed May 14, 2018, which is a continuation of U.S. application Ser. No. 14/895,160, filed on Dec. 1, 2015 (now U.S. Pat. No. 10,004,044), which is based on PCT application No. PCT/JP2014/066410, filed on Jun. 20, 2014, and claims priority to Japanese Patent Application 2013-171018, filed on Aug. 21, 2013, the entire contents of each of which is incorporated herein by reference.

TECHNICAL FIELD

The present disclosure relates to a communication control apparatus and a wireless communication apparatus.

BACKGROUND ART

The secondary usage of frequencies is being discussed as one countermeasure for relieving the depletion of frequency resources in the future. Secondary usage of frequencies refers to another system secondarily using some or all of the frequency channel preferentially allocated to a first system. Generally, the system to which the frequency channel is preferentially allocated is called the primary system, while the system that secondarily uses the frequency channel is called the secondary system. A typical example of a secondary system is a cognitive radio system.

TV white spaces are an example of frequency channels whose secondary usage is being discussed (see Non-Patent Literature 1). TV white spaces refer to channels, from among the frequency channels allocated to a television broadcasting system that acts as a primary system, which are not being used by that television broadcasting system depending on the geographical area. By opening up these TV white spaces to secondary systems, efficient frequency resource utilization may be realized. Non-Patent Literature 1 defines the technical requirements and operational requirements of a white space device (WSD) using a secondary system. A device that manages a secondary system is also called a master WSD, while a device that participates in a secondary system is also called a slave WSD.

During secondary usage of a frequency band, the secondary system ordinarily is demanded to be operated so as not to exert harmful interference on the primary system. One important technology for this purpose is transmit power control. For example, Patent Literature 1 and Patent Literature 2 disclose technology for restraining the aggregated interference that multiple secondary systems exert on the primary system to an allowed level.

CITATION LIST

Patent Literature

Patent Literature 1: JP 2012-151815A
Patent Literature 2: JP 2013-78096A

Non-Patent Literature

Non-Patent Literature 1: ECC Electronic Communications Committee), "Technical and operational requirements for the operation of white space devices under geo-location approach", ECC REPORT 186, January 2013

SUMMARY OF INVENTION

Technical Problem

However, the calculation cost for evaluating the aggregated interference exerted on the primary system increases as the number of secondary systems increases. For example, if the number of master WSDs secondarily using the white space for the same primary system doubles, the calculation cost may quadruple. If the calculation for interference evaluation does not finish within an allowed time, power allocation is unable to track variation in the number of secondary systems, and the validity of control possibly may be lost.

Consequently, it is desirable to realize a mechanism capable of achieving both prevention of harmful interference and promptness of power allocation under conditions in which multiple secondary systems may be managed.

Solution to Problem

According to the present disclosure, there is provided a communication control apparatus including: a calculation unit configured to calculate a transmit power to be allocated, including a nominal transmit power and a margin for interference avoidance, for one or more secondary systems that secondarily use frequency channels protected for a primary system; and a determination unit configured to determine a variation in a number of secondary systems, and cause the calculation unit to adjust the margin for interference avoidance on a basis of the determined variation.

According to the present disclosure, there is provided a communication control apparatus including: a communication unit configured to communicate with a master device of one or more secondary systems that secondarily use frequency channels protected for a primary system; and a control unit configured to signal, on a basis of information acquired from a data server that calculates an allocated transmit power for the secondary systems including a nominal transmit power and a margin for interference avoidance adjusted on a basis of variation in a number of secondary systems, parameters for specifying the allocated transmit power to the master device via the communication unit.

According to the present disclosure, there is provided a wireless communication apparatus that operates and manages a secondary system that secondarily uses a frequency channel protected for a primary system, the wireless communication apparatus including: a communication unit configured to receive signaling of parameters for specifying an allocated transmit power based on information acquired from a data server that calculates the allocated transmit power for the secondary system including a nominal transmit power and a margin for interference avoidance adjusted on a basis of variation in a number of secondary systems; and a communication control unit configured to control wireless communication between the wireless communication apparatus and one or more terminal apparatuses according to the allocated transmit power specified using the parameters.

Advantageous Effects of Invention

According to the technology in accordance with the present disclosure, it is possible to achieve both prevention of harmful interference prevention and promptness of power allocation under conditions in which multiple secondary systems may be managed.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 9B is a second sequence diagram illustrating an example of a signaling sequence in a system according to an embodiment.

FIG. 10 is a block diagram illustrating an example of a logical configuration of a wireless communication apparatus according to an embodiment.

FIG. 15 is a block diagram illustrating an example of a schematic configuration of a car navigation apparatus.

DESCRIPTION OF EMBODIMENTS

Figure 1:
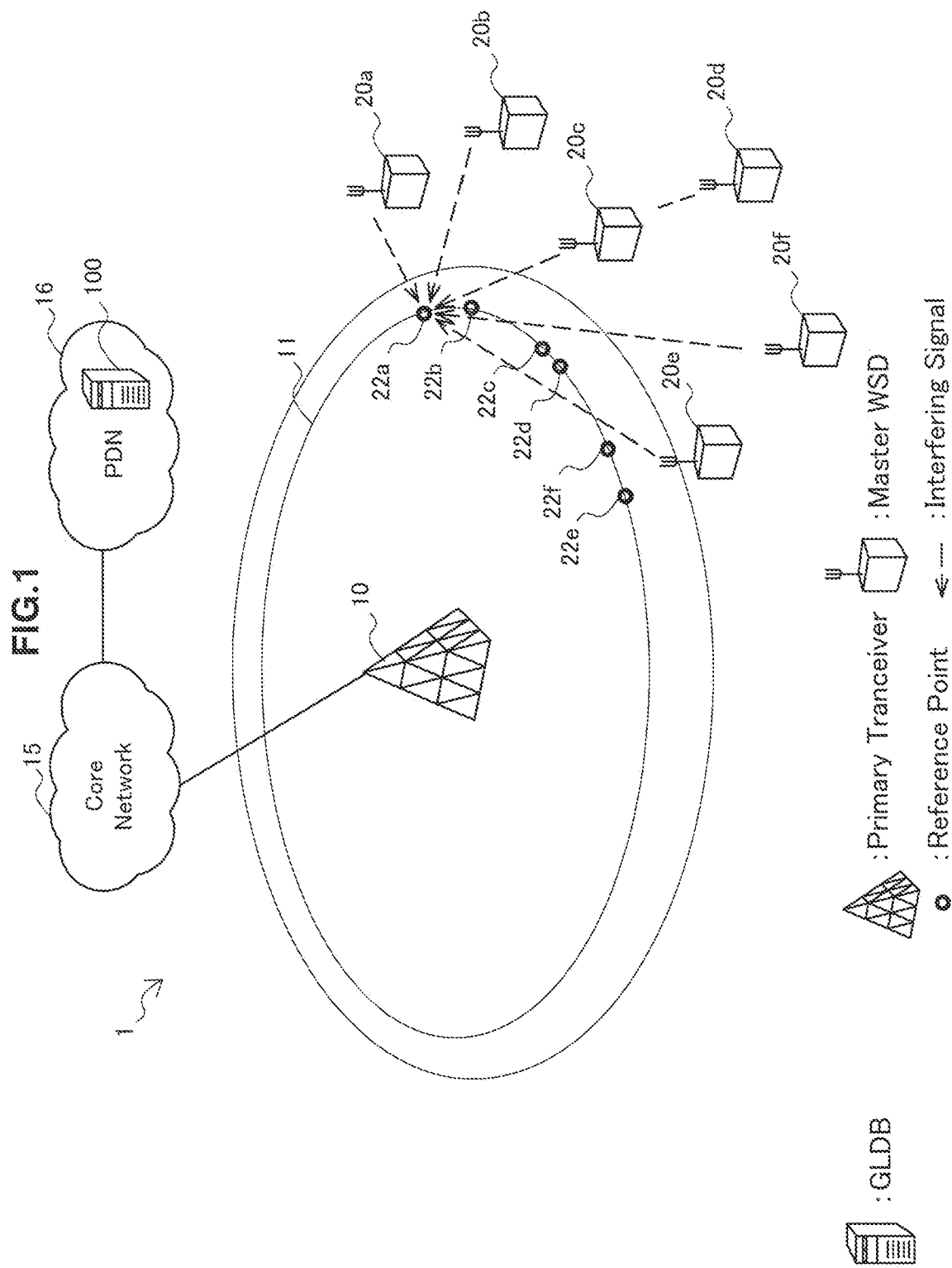
FIG. 1 is an explanatory diagram for describing an overview of a communication control system according to an embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Also, the description will proceed in the following order.
1. Overview of system
   1-1. System model using GLDB
   1-2. Change in number of secondary systems
   1-3. Delayed power allocation
2. Examples of power calculation model
   2-1. Existing technique
   2-2. Simpler technique
3. Exemplary configuration of communication control apparatus
   3-1. Component configuration
   3-2. Modifications
4. Process flows
   4-1. Power distribution process
   4-2. Margin adjustment process
   4-3. Signaling sequence
5. Exemplary configuration of wireless communication apparatus
6. Another example of system model
7. Applications
   7-1. Example application related to communication control apparatus
   7-2. Example application related to wireless communication apparatus
8. Conclusion

1. Overview of System

1-1. System Model Using GLDB

FIG. 1 is an explanatory diagram for describing a summary of a communication control system 1 according to an embodiment of technology in accordance with the present disclosure. The communication control system 1 includes a primary transceiver 10, one or more wireless communication apparatuses 20a, 20b, and so on, and a communication control apparatus 100.

The primary transceiver 10 is a transceiver installed to manage a primary system on a frequency channel that has been legally licensed or assigned usage rights. The primary transceiver 10 transmits wireless signals of the primary system to primary terminals (not illustrated) positioned inside a service area 11. The primary system may be a television broadcasting system such as a Digital Video Broadcasting—Terrestrial (DVB-T) system, for example. In this case, a primary receiver is a receiver including a television antenna and a tuner (also called an incumbent receiver). Additionally, the primary system may also be a mobile communication system that operates in accordance with a communication scheme such as LTE, LTE-A, GSM, UMTS, W-CDMA, CDMA200, WiMAX, WiMAX 2, or IEEE 802.16. Additionally, the primary system may also be another type of wireless communication system such as an aircraft radio system (for example, the Aeronautical Radio Navigation Service (ARNS)).

The primary transceiver 10 is connected to a core network 15. The core network 15 includes multiple control nodes that respectively have roles such as user information management, terminal mobility management, packet forwarding and gateway.

Each of the wireless communication apparatuses 20a, 20b, and so on is a master device that manages a secondary system by secondarily using a frequency channel protected for the primary system. Each of the wireless communication apparatuses 20a, 20b, and so on may be the master WSD described in Non-Patent Literature 1, for example, or some other type of device, such as a small-cell base station or a wireless access point. Small cells may include femtocells, nanocells, picocells, microcells, and the like.

Note that in this specification, when the wireless communication apparatuses 20a, 20b, and so on are not being distinguished from each other, these apparatuses will be collectively referred to as the wireless communication apparatus 20 by omitting the trailing letters of the reference signs. This applies similarly to the other structural elements.

The wireless communication apparatus 20 transmits and receives wireless signals to and from a slave device (not illustrated) positioned near the wireless communication apparatus 20 itself. When the secondary system exists in the vicinity of the service area 11, the wireless signals of the secondary system interfere with the primary terminals. When multiple secondary systems exist as in the example of FIG. 1, the interference observed at a primary terminal may be aggregated.

The wireless communication apparatus 20 connects to a packet data network (PDN) 16 via backhauling. The backhauling may be a wired link or a wireless link. The PDN 16 connects to the core network 15 via a gateway (not illustrated).

The communication control apparatus 100 is a data server disposed on the PDN 16. The communication control apparatus 100 may be the geo-location database (GLDB) described in Non-Patent Literature 1, for example, or some other type of server. The communication control apparatus 100 is not limited to the example of FIG. 1, and may also be disposed on the core network 15. Also, a functional entity including functions similar to the communication control apparatus 100 may also be implemented in the primary transceiver 10. The communication control apparatus 100 allows transmit power to each secondary system so that the aggregated interference caused by wireless signals from one or more secondary systems does not exert harmful effects on the primary system. For example, the wireless communication apparatus 20, which is the master device of each secondary system, transmits an activation request to the communication control apparatus 100 via backhauling when starting the operation and management of the system. The communication control apparatus 100, in response to receiving the activation request, calculates the transmit power that should be allocated to each secondary system. Subsequently, the communication control apparatus 100 notifies the wireless communication apparatus 20 of the transmit power allocation result (as well as other information, such as a list of channels available for use). Through such a procedure, the operation and management of secondary systems become possible.

Typically, the aggregated interference caused by wireless signals from secondary systems is estimated as an interference level at some location (called a reference point) inside the service area 11. Subsequently, the communication control apparatus 100 calculates the transmit power to allocate to each secondary system so that the estimated interference level does not exceed an allowed level. The reference point may also be a location on a protection contour of the service area 11 where the distance from each wireless communication apparatus 20 is the shortest, for example. Alternatively, the reference point may also be the location where the primary terminal the shortest distance away from each wireless communication apparatus 20 is present. In the example of FIG. 1, the reference points 22a, 22b, and so on corresponding to each of the wireless communication apparatuses 20a, 20b, and so on are configured on a protection contour of the service area 11.

For example, the power distribution method described in Patent Literature 1 or the margin minimization method (a technique using a flexible minimized margin) described in Non-Patent Literature 2 has the advantage of being able to allocate a larger transmit power to a secondary system as a result of configuring as small a margin for interference avoidance as possible, and thus raise the throughput of the secondary system. However, with these techniques, since the aggregated interference is evaluated at all reference points, the calculation cost for calculating the transmit power to allocated increases as the number of secondary systems increases. In the simplest example, the calculation cost may increase on the order of the square of the number of secondary systems (the product of the number of reference points and the number of secondary systems). Additionally, if factors such as the process for the configuration of the reference points and the signaling overhead are also considered, the calculation cost for calculating the transmit power to allocate becomes non-negligible.

1-2. Change in Number of Secondary Systems

Figure 2:
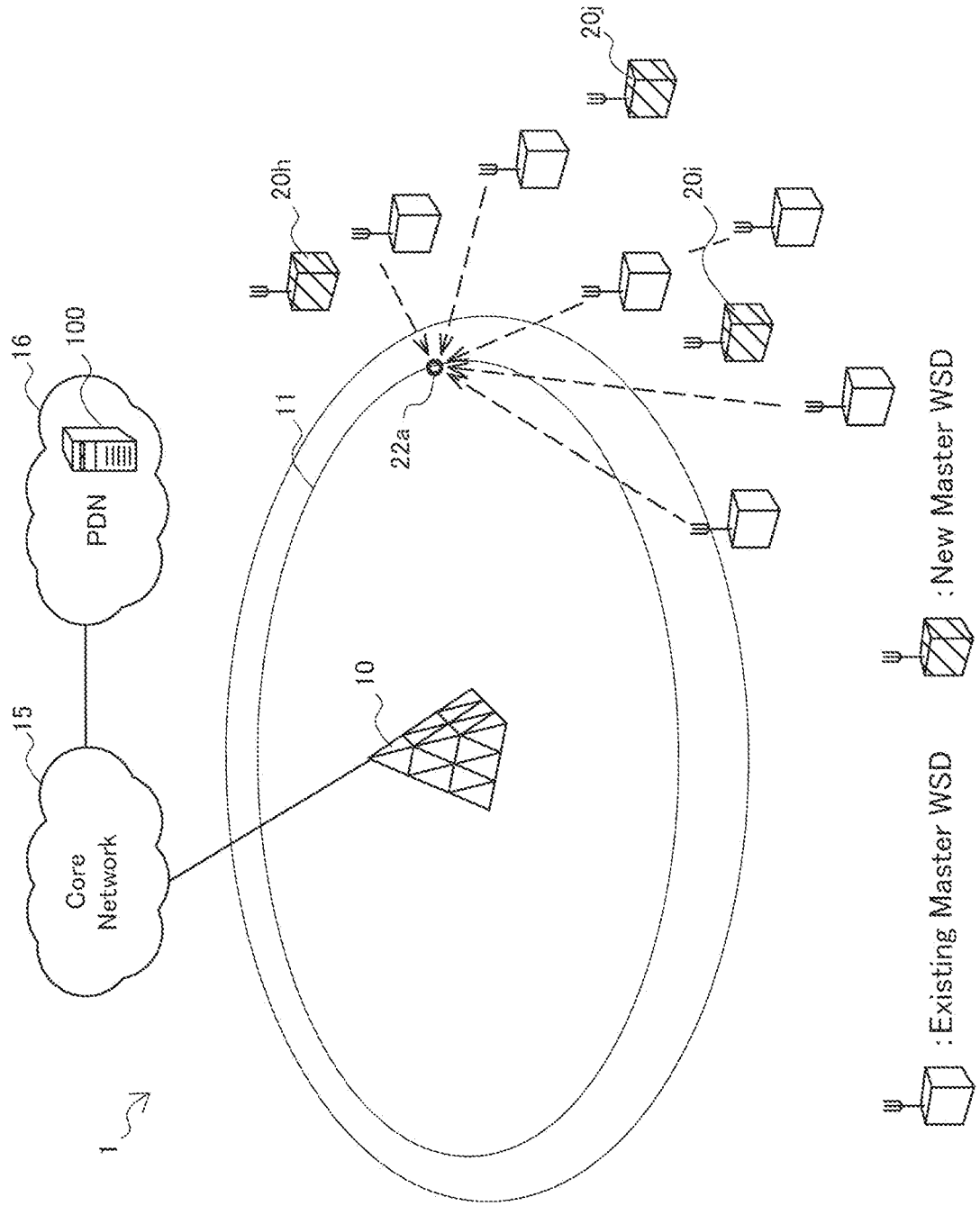
FIG. 2 is an explanatory diagram for describing an example of a scenario in which secondary systems increase.

A change in the number of secondary systems may occur due to various factors. For example, referring to FIG. 2 in contrast to FIG. 1, the wireless communication apparatuses 20h, 20i, and 20j are newly included in the communication control system 1. Each of the wireless communication apparatuses 20h, 20i, and 20j is also a master device that operates and manages a secondary system. As a result, the number of secondary systems increases from six to nine. The wireless communication apparatuses 20h, 20i, and 20j may be devices that moved from another place to the vicinity of the service area 11, or devices that returned from sleep mode to active mode. In the recent mobile environment with a wide proliferation of mobile devices in which fine-grained sleep control is often desired for power savings, such changes in the number of secondary systems occur frequently. Consequently, it is desirable for the allocation of transmit power to secondary systems to be capable of adequately tracking changes in the number of secondary systems.

Figure 3:
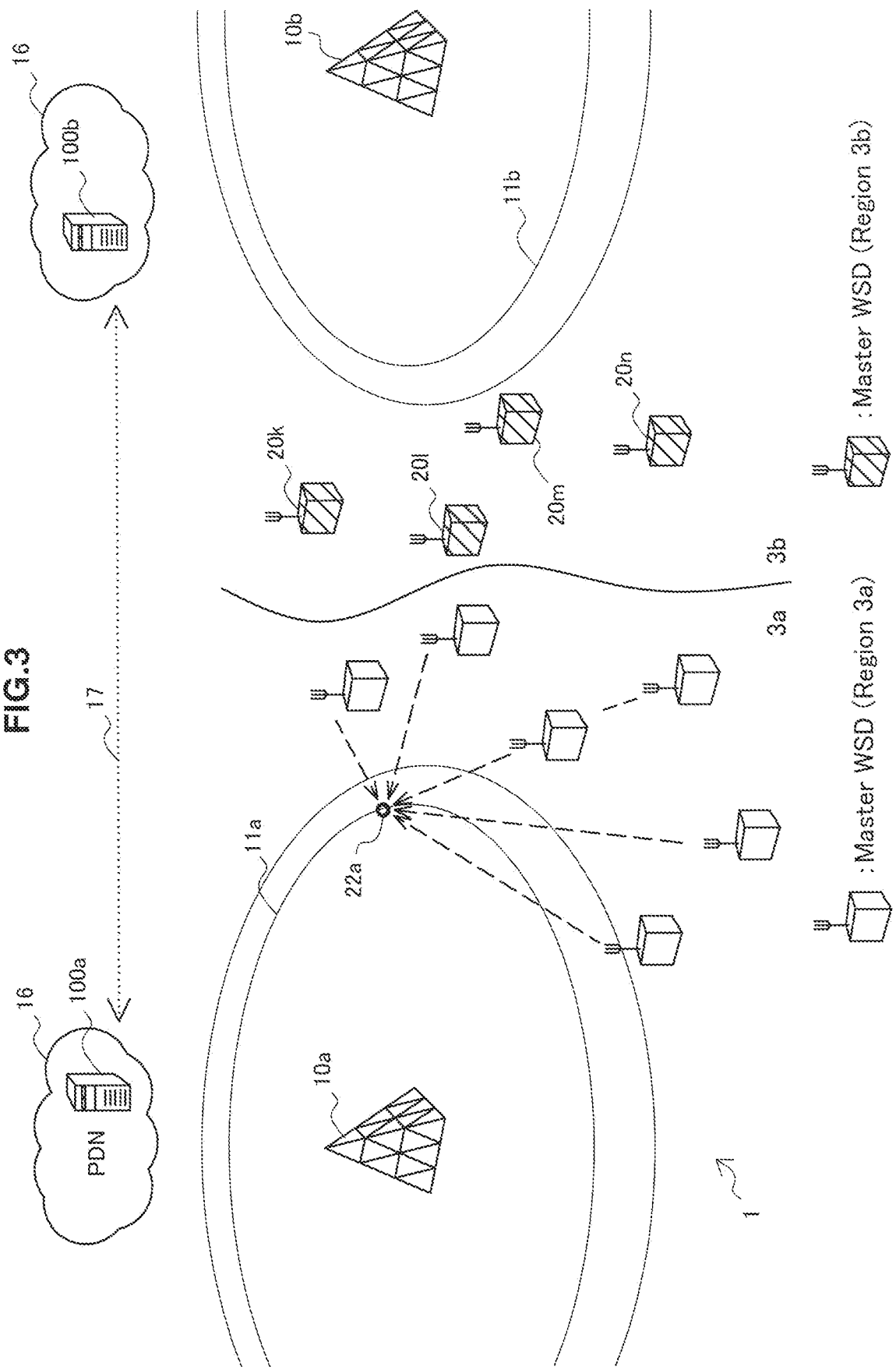
FIG. 3 is an explanatory diagram for describing another example of a scenario in which secondary systems increase.

The left half of FIG. 3 illustrates a primary transceiver 10a that operates and manages a primary system inside a service area 11a in a geographical region 3a. A communication control apparatus 100a has the authority to allocate transmit power to one or more secondary systems that secondarily use a frequency channel for the purpose of the primary transceiver 10a inside the geographical region 3a. The right half of FIG. 3 illustrates a primary transceiver 10b that operates and manages a primary system inside a service area 11b in a geographical region 3b. A communication control apparatus 100b has the authority to allocate transmit power to one or more secondary systems that secondarily use a frequency channel for the purpose of the primary transceiver 10b inside the geographical region 3b. Herein, depending on the positional relationships of devices between the regions or the conditions of transmit power allocation, there is a possibility that the communication control apparatus 100a may need to account for interference signals from secondary systems inside the geographical region 3b. In such cases, the number of secondary systems that must be introduced into the power allocation calculation may also increase.

Figure 4:
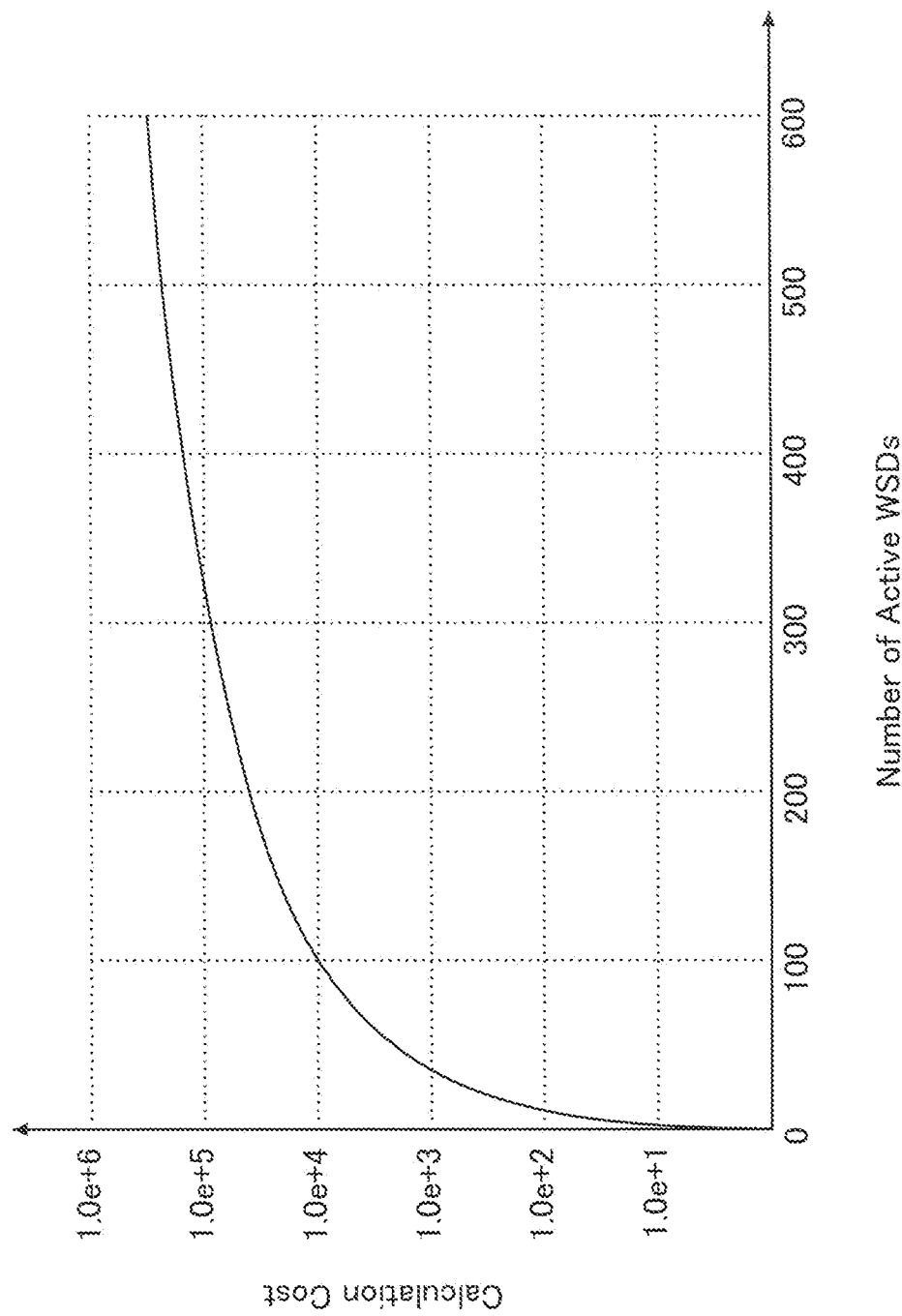
FIG. 4 is a graph illustrating an example of the relationship between the number of secondary systems and the calculation cost of transmit power to allocate.

FIG. 4 is a graph illustrating an example of the relationship between the number of secondary systems and the calculation cost of transmit power to allocate. The horizontal axis of FIG. 4 indicates the number of active primary WDSs, or in other words the number of secondary systems that must be introduced into the power allocation calculation. The vertical axis of FIG. 4 indicates the calculation cost of power allocation as estimated according to a certain simulation model. As FIG. 4 demonstrates, the calculation cost increases as the number of master devices of secondary systems becomes larger.

1-3. Delayed Power Allocation

As discussed above, it is desirable for the allocation of transmit power to secondary systems to be capable of adequately tracking changes in the number of secondary systems. However, if the calculation cost becomes great, there is a risk that the power allocation calculation may not finish within a designated calculation period, and the allocation of transmit power becoming may become delayed.

Figure 5:
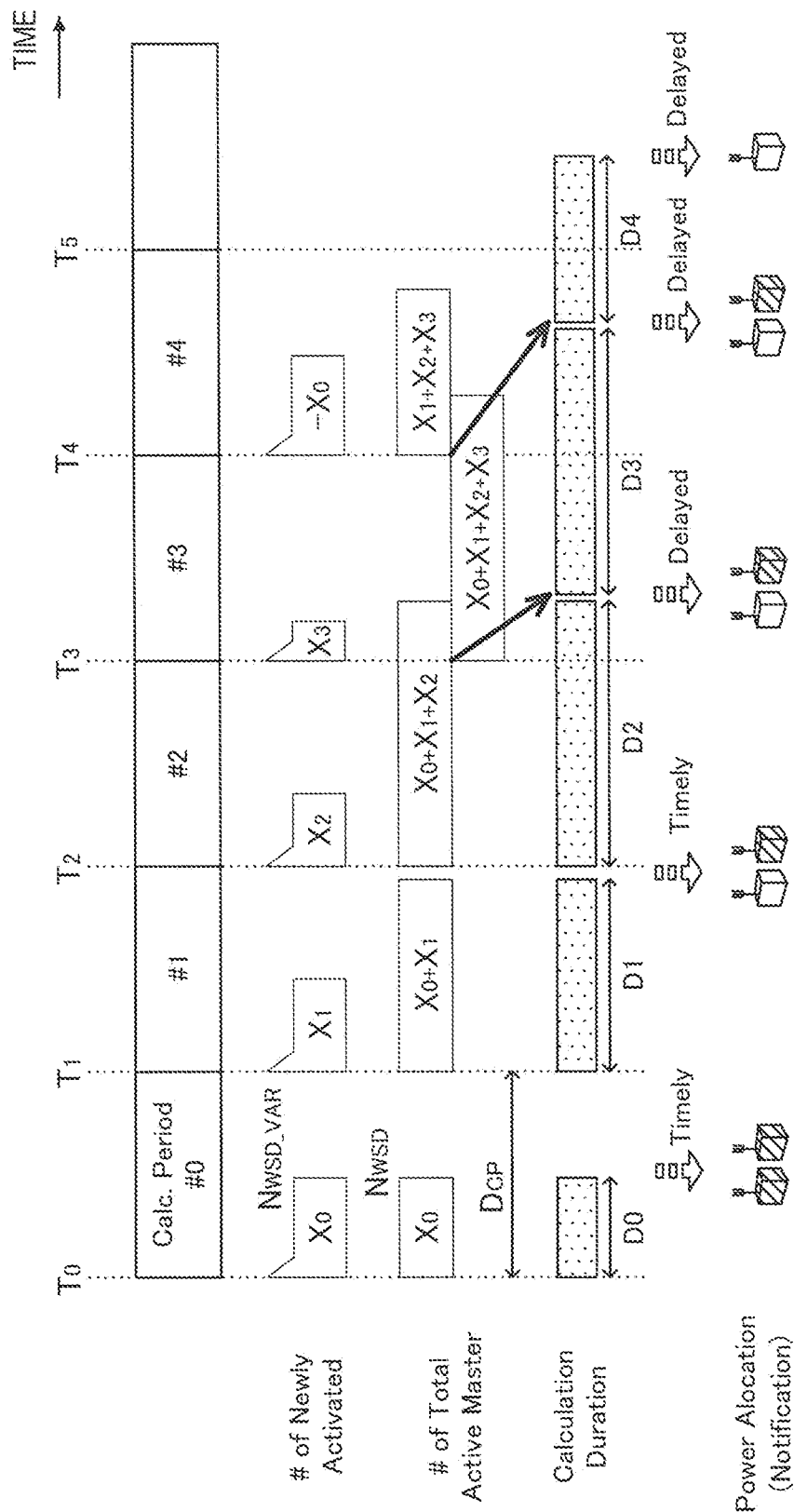
FIG. 5 is an explanatory diagram for describing an example of delayed power allocation.

FIG. 5 is an explanatory diagram for describing an example of delayed power allocation. In the example of FIG. 5, the calculation of power allocation is executed periodically in a period $D_{CP}$ along the time axis in the horizontal direction. The period $D_{CP}$ may be defined in units of subframes, radio frames, milliseconds, seconds, or the like, for example.

At time $T_0$, $X_0$ secondary systems are activated. The transmit power to be allocated to the $X_0$ secondary systems is calculated over a time duration Do. Since the time duration Do is shorter than the period $D_{CP}$, each secondary system is notified of the power allocation result in a timely manner. At time $T_1(=T_0+D_{CP})$, $X_1$ secondary systems are additionally activated. The transmit power to be allocated to the $X_0+X_1$ secondary systems is calculated over a time duration $D_1$. Since the time duration $D_1$ is shorter than the period $D_{CP}$, each secondary system is notified of the power allocation result in a timely manner. At time $T_2$, $X_2$ secondary systems are additionally activated. The transmit power to be allocated to the $X_0+X_1+X_2$ secondary systems is calculated over a time duration $D_2$. Since the time duration $D_2$ is longer than the period $D_{CP}$, the notification to each secondary system of the power allocation result is delayed until after the next calculation period starts at time $T_3$. At time $T_3$, $X_3$ secondary systems are additionally activated. The transmit power to be allocated to the $X_0+X_1+X_2+X_3$ secondary systems is calculated over a time duration $D_3$. The notification to each secondary system of the power allocation result is delayed even further than the previous time. At time $T_4$, $X_0$ secondary systems are deactivated. The transmit power to be allocated to the $X_1+X_2+X_2+X_3$ secondary systems is calculated over a time duration $D_4$. Even though the time duration $D_4$ is shorter than the period $D_{CP}$, the effects of the delay from the previous time still remain, and thus the notification to each secondary system of the power allocation result is delayed until after the next calculation period starts at time $T_5$.

Such delay may lead various adverse effects, such as a loss of communication opportunities for the secondary systems because transmit power is not allocated, a drop in resource utilization efficiency, and the production of harmful interference caused by the power allocation not being updated in a timely manner. Accordingly, in the embodiment discussed later, to counteract these adverse effects and achieve both prevention of harmful interference and promptness of power allocation, there is realized a mechanism that adaptively switches the algorithm for power allocation between an existing technique having a large calculation cost, and a simpler technique of estimating the margin. The existing technique having a large calculation cost may be the power distribution method described in Patent Literature 1 or the margin minimization method described in Non-Patent Literature 2, for example.

2. Examples of Power Calculation Model

2-1. Existing Technique

Herein, a power calculation model that resembles the model described in Non-Patent Literature 2 will be described briefly.

In this power calculation model, the transmit power to allocate to each secondary system is calculated by using a nominal transmit power of the relevant secondary system and a margin for interference avoidance. The nominal transmit power $P_{IB}^{SingleWSD}$ of a secondary system may also be called the maximum radiated power, and be calculated according to the following formula. The reference point in this case is the closest location on the protection contour from the master device (or the position of the closest primary transceiver). When a primary transceiver is not present, the reference point may also be set to infinity. Note that in this specification, formulas are expressed in decibel form as a general rule.

[Math. 1]

$$P_{IB}^{SingleWSD} \le m_Z - m_G - r(df) - SM \tag{1}$$

In Expression (1), $m_Z$ is the minimum receiving sensitivity of a primary terminal, $m_G$ is the path gain, r(df) is the protection ratio corresponding to a discrete frequency df, and SM is the shadowing margin. The path gain may depend on the distance between the location where the device is present and the reference point, and the antenna height of the device. The protection ratio may depend on the frequency channel to be secondarily used. The transmit power $P_{IB}^{WSD}$ to allocate to each secondary system is calculated by subtracting the interference avoidance margin IM from the nominal transmit power according to the following expression, so that the level of aggregated interference from multiple secondary systems does not become harmful at the reference point.

[Math. 2]

$$P_{IB}^{WSD} \le P_{IB}^{SingleWSD} - IM \tag{2}$$

Whereas the nominal transmit power $P_{IB}^{SingleWSD}$ is different for each secondary system, in principle the interference avoidance margin IM may be shared in common for all secondary systems. To calculate the interference avoidance margin IM, the three techniques of the fixed margin method, the flexible margin method, and the margin minimization method are known.

In the fixed margin method, the interference avoidance margin IM is calculated according to the following expression using the total number $N_{Potential}$ of secondary systems.

[Math. 3]

$$IM = 10 \log_{10}(N_{potential}) \tag{3}$$

In the flexible margin method, the interference avoidance margin IM is calculated according to the following expression using the number $N_{Active}(f_{WSD})$ of active secondary system per channel. Note that herein, an active secondary system may mean simply an activated system, or mean a system using a transmit power exceeding some base value in the channel $f_{WSD}$.

[Math. 4]

$$IM = 10\log_{10}\left(\max_{f}(N_{Active}(f_{WSD}))\right) \quad (4)$$

In the margin minimization method, the interference avoidance margin IM is calculated according to the following expression using the total number $N_{Potential}$ of secondary systems and a margin reduction term a.

[Math. 5]

$$IM = 10\ \log_{10}(N_{Potential}) - \alpha \quad (5)$$

where $\alpha = m_Z - r(0) - SM - I_{Agg,max}$

Herein, r(0) represents the protection ratio of a discrete frequency zero, or in other words a co-channel, while $I_{Agg,max}$ represents the aggregated interference quantity at the reference point where interference is greatest. This aggregated interference quantity may also include interference quantities from other systems. In the fixed margin method and the flexible margin method, the primary system is carefully protected, but in the margin minimization method, the throughput of the secondary system is raised by the contribution of the margin reduction term a, and the resource utilization efficiency may be improved. However, in the margin minimization method, deriving the aggregated interference quantity $I_{Agg,max}$ demands evaluation of the levels of aggregated interference at all reference points.

2-2. Simpler Technique

(1) Relationship Between Number of Secondary Systems and Margin Adjustment

According to an embodiment, when the number of secondary systems changes after transmit power is allocated to the secondary systems according to the power calculation model discussed above, the previously calculated transmit power may be adjusted on the basis of the variation in the number of secondary systems. The adjustment of transmit power is conducted simply by adjusting the interference avoidance margin IM on the basis of the variation in the number of secondary systems. The following relational expression holds true among the already-allocated interference avoidance margin that was calculated at a previous base point in time (according to the margin minimization method, for example), the adjusted interference avoidance margin IM, and the margin adjustment.

[Math. 6]

$$IM' = IM_{Base} + dM \quad (6)$$

Herein, IM' is the adjusted interference avoidance margin, $IM_{Base}$ is the interference avoidance margin at the base point in time (the base value of adjustment), and dM is the margin adjustment.

At this point, provided that $N_{WSD}$ is the number of secondary systems at the base point in time, and $N_{WSD\_VAR}$ is the variation in the number of secondary systems since the base point in time, the margin adjustment dM may be expressed as follows from Expressions (5) and (6). Note that the number of secondary systems and the variation thereof may refer to active devices only, or to the total number.

$$\begin{aligned}dM &= IM' - IM_{Base} \quad (7)\\ &= 10\log_{10}(N_{WSD} + N_{WSD\_VAR}) - \alpha_{Adj} - \\ &\quad (10\log_{10}(N_{WSD}) - \alpha_{Prev})\\ &= 10\log_{10}\left(\frac{N_{WSD} + N_{WSD\_VAR}}{N_{WSD}}\right) - \alpha_{Adj} + \alpha_{Prev}\\ &= 10\log_{10}\left(\frac{N_{WSD} + N_{WSD\_VAR}}{N_{WSD}}\right) + 10\log_{10}\\ &\quad \left(Y + \text{sgn}(N_{WDS\_VAR}) \cdot 10^{\frac{dI}{10}}\right) - 10\log_{10}(Y)\\ &= 10\log_{10}\left(\frac{N_{WSD} + N_{WSD\_VAR}}{N_{WSD}} \cdot \frac{Y + \text{sgn}(N_{WDS\_VAR}) \cdot 10^{\frac{dI}{10}}}{Y}\right)\end{aligned}$$

where $\text{sgn}(x) = \begin{cases} 1: x > 0 \\ 0: x = 0 \\ -1: x < 0 \end{cases}$ and $Y = 10^{\frac{I_{Agg,max}}{10}}$ In Expression (7), dI represents the magnitude of the variation in the aggregated interference quantity $I_{Agg,max}$ corresponding to the variation $N_{WSD\_VAR}$ in the number of secondary systems (hereinafter called the estimated interference variation). To reduce the calculation cost, the estimated interference variation dI is not calculated precisely, but instead estimated simply on the basis of the variation $N_{WSD\_VAR}$ in the number of secondary systems. Several techniques for calculating the estimated interference variation dI are described below.

(2-1) Calculation of Estimated Interference Variation (First Technique)

In the first technique, the estimated interference variation dI is estimated using a table that defines a mapping between the variation $N_{WSD\_VAR}$ in the number of secondary systems and the estimated interference variation dI. Table 1 and Table 2 respectively illustrate examples of mapping tables. In Table 1, the estimated interference variation dI is mapped directly to the variation $N_{WSD\_VAR}$ in the number of secondary systems. On the other hand, in Table 2, the estimated interference variation dI is mapped to a range to which the variation $N_{WSD\_VAR}$ in the number of secondary systems belongs.

TABLE 1

Example of mapping between variation $N_{WSD\_VAR}$ in number of secondary systems and estimated interference variation dI

| $N_{WSD\_VAR}$ | dI (dB) |
|---|---|
| $K_1$ | $dI_1$ |
| $K_2$ | $dI_2$ |
| $K_3$ | $dI_3$ |
| . | . |
| . | . |
| . | . |
| $K_x$ | $dI_x$ |

TABLE 2

Another example of mapping between variation $N_{WSD\_VAR}$ in number of secondary systems and estimated interference variation dI

| Range of $N_{WSD\_VAR}$ | dI (dB) |
|---|---|
| [K$_1$, K$_2$] | dI$_1$ |
| [K$_2$, K$_3$] | dI$_2$ |
| [K$_3$, K$_4$] | dI$_3$ |
| . | . |
| . | . |
| . | . |
| [K$_{X-1}$, K$_X$] | dI$_X$ |

According to the first technique, by performing a lookup in a predefined mapping table, the estimated interference variation dI may be derived with a small calculation cost.

(2-2) Calculation of Estimated Interference Variation (Second Technique)

In the second technique, the estimated interference variation dI is estimated on the basis of an assumption that the number of secondary systems and the aggregated interference quantity are proportional. Under this assumption, the estimated interference variation dI may be expressed as in the following expression.

[Math. 8]

$$dI = 10\log_{10}\left(\frac{|N_{WSD\_VAR}|}{N_{WSD}} \cdot Y\right) \qquad (8)$$

Substituting Expression (8) into Expression (7), the relational expression between the number of secondary systems and the margin adjustment may be transformed as follows.

[Math. 9]

$$dM = 10\log_{10}\left(\frac{\frac{N_{WSD}+N_{WSD\_VAR}}{N_{WSD}} \cdot}{Y + \text{sgn}(N_{WDS\_VAR}) \cdot \left(\frac{|N_{WSD\_VAR}|}{N_{WSD}} \cdot Y\right)} \cdot Y\right) \qquad (9)$$

$$= 10\log_{10}\left(\frac{N_{WSD}+N_{WSD\_VAR}}{N_{WSD}} \cdot \left(1 + \frac{N_{WSD\_VAR}}{N_{WSD}}\right)\right)$$

$$= 20\log_{10}\left(1 + \frac{N_{WSD\_VAR}}{N_{WSD}}\right)$$

Consequently, in this case, the margin adjustment dM may be computed simply, using only the number $N_{WSD}$ of secondary systems at the base point in time and the variation $N_{WSD\_VAR}$ in the number of secondary systems.

Note that by incorporating the approach of the flexible margin method into Expression (7), the margin adjustment dM may also be computed as in the following expression.

[Math. 10]

$$dM = \qquad (10)$$

$$10\log_{10}\left(\left(1 + \frac{N_{WSD\_VAR}}{N_{WSD}} \cdot \frac{\max_m(f_m(N_{WSD\_VAR}))}{N_{channel}}\right) \cdot \frac{N_{WSD}+N_{WSD\_VAR}}{N_{WSD}}\right)$$

In Expression (10), $f_m(N_{WSD\_VAR})$ expresses the number of secondary systems to which the mth frequency channel is allocated from among the variation $N_{WSD\_VAR}$ in the number of secondary systems.

(2-3) Calculation of Estimated Interference Variation (Third Technique)

In the third technique, the estimated interference variation dI is estimated according to the following expression as a worst case.

[Math. 11]

$$dI = 10\log_{10}\left(10^{\frac{I_{TH}}{10}} - 10^{\frac{I_{Agg,max}}{10}}\right) \qquad (11)$$

In Expression (11), $I_{TH}$ represents a threshold value that may correspond to the maximum value of the aggregated interference allowed by the primary terminal.

(3) Technique for Counting Number of Secondary Systems

The number of secondary systems in the power calculation model described in this section may be based on one or both of the number of master devices and the number of slave devices in the secondary systems. For example, when the secondary systems are operated and managed according to a time-division scheme, and the slave devices use a transmit power approximately equal to (or lower than) the transmit power of the master device, it is sufficient to count only the number of master devices as the number of secondary systems. On the other hand, when a master device and a slave device potentially may transmit signals at the same time, for example, the calculation of a safe power may be ensured by counting both master devices and slave devices as the number of secondary systems.

These numbers of devices may also be calculated by including weights depending on the device configuration. As used herein, the device configuration may include one or more from among the antenna height, the transmit power (which may be a maximum or desired transmit power, or the allocated transmit power for an existing device), and the frequency channel to be used. As an example, the higher the antenna of a device, the greater is the contribution to interference of a signal emitted from that device. Accordingly, by counting (performing a weighted sum of) the number of devices using ratios of antenna heights among the devices as weights, the risk of harmful interference may be effectively reduced through power recalculation or adjustment.

A mechanism that allocates transmit power to secondary systems in a timely manner using the power calculation model described in this section will now be described in the subsequent sections.

Figure 6:
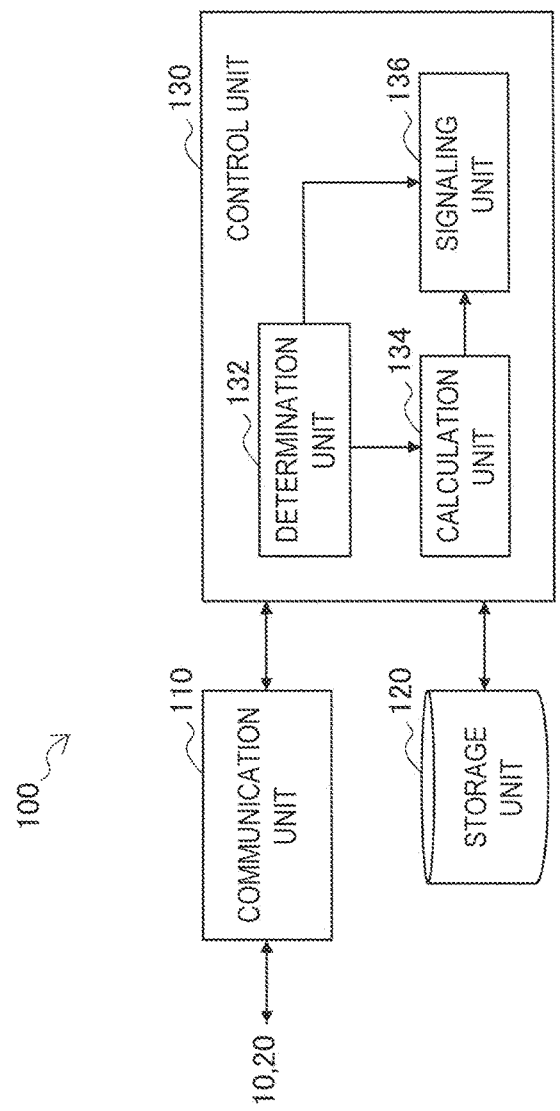
FIG. 6 is a block diagram illustrating an example of a logical configuration of a communication control apparatus according to an embodiment.

3. Exemplary Configuration of Communication Control Apparatus 3-1. Component Configuration FIG. 6 is a block diagram illustrating an example of a logical configuration of the communication control apparatus 100 according to an embodiment. Referring to FIG. 6, the communication control apparatus 100 includes a communication unit 110, a storage unit 120, and a control unit 130.

(1) Communication Unit

The communication unit 110 communicates with the wireless communication apparatus 20 via backhauling of the wireless communication apparatus 20. For example, the communication unit 110 receives an activation request from a wireless communication apparatus 20 that has been activated or moved to the geographical region managed by the communication control apparatus 100. The communication unit 110 also receives secondary system information to be discussed later from the relevant wireless communication apparatus 20. Subsequently, after a calculation for the purpose of power allocation is executed by the control unit 130, the communication unit 110 transmits power allocation-related information based on the calculation result to the wireless communication apparatus 20.

The communication unit 110 may also communicate with the primary transceiver 10 and the control nodes on the core network 15. Additionally, the communication unit 110 may also communicate with a data server (for example, a GLDB that manages a neighboring region) having the authority to allocate transmit power in a region near the geographical region managed by the communication control apparatus 100.

(2) Storage Unit

The storage unit 120 uses a storage medium such as a hard disk or semiconductor memory to store programs and data for the operation of the communication control apparatus 100. Data stored by the storage unit 120 includes, for example, primary system information collected from the primary transceiver 10 or control nodes on the core network 15, or stored in advance. The primary system information may include one or more from among the position of the primary transceiver, the service area deployment, protected frequency channels, the minimum receiving sensitivity of the primary terminals, the protection ratio, the shadowing margin, the allowed interference level, an identifier of a wireless access technology, and a measured interference level, for example. The position of the primary transceiver and the service area deployment may be used when specifying a reference point in the power calculation model discussed earlier, for example.

In addition, the data stored by the storage unit 120 includes secondary system information collected from each of the wireless communication apparatuses 20. The secondary system information may include one or more from among the identifier of the master device, the position, the antenna height, the device type, emission characteristics (for example, the adjacent channel leakage ratio (ACLR)), an identifier of a wireless access technology, and transmit power information (for example, maximum transmit power and/or desired transmit power).

In addition, the data stored by the storage unit 120 may include power allocation-related information reported to the wireless communication apparatus 20. The power allocation-related information may include one or more from among a list of frequency channels available for use, a nominal transmit power (maximum radiated power), an interference avoidance margin, an adjustment of the interference avoidance margin, and the period of validity for the information.

In addition, the data stored by the storage unit 120 includes parameters used to calculate the power allocation. The parameters herein may include one or more from among a power allocation calculation period, a determination threshold to be compared against the number of secondary systems, a mapping table for deriving the estimated interference variation, as well as the number of secondary systems, the aggregated interference quantity, and the interference avoidance margin at a previous base point in time, for example.

(3) Control Unit

The control unit 130 controls overall operation of the communication control apparatus 100. In the present embodiment, the control unit 130 includes a determination unit 132, a calculation unit 134, and a signaling unit 136.

(3-1) Determination Unit

When there is a change in the number of secondary systems within the geographic region managed by the communication control apparatus 100, the determination unit 132 switches the calculation process for the purpose of power allocation to be executed by the calculation unit 134, according to a condition depending on the number of secondary systems. As an example, when the changed number of secondary systems falls below a determination threshold, the determination unit 132 causes the calculation unit 134 to recalculate the transmit power that should be allocated to the secondary systems according to the margin minimization method in the power calculation model discussed earlier. Also, when the changed number of secondary systems exceeds a determination threshold, the determination unit 132 causes the calculation unit 134 to adjust the previously calculated transmit power. The determination threshold herein is configured so that the estimated calculation time dependent on the number of secondary systems does not exceed an allowed calculation time.

The allowed calculation time may be configured in advance according to any conditions, such as the requirements for the operation and management of the secondary systems, the hardware limitations of the communication control apparatus 100, and the rules of the carrier that operates and manages the communication control apparatus 100. In addition, the determination unit 132 may also configure the allowed calculation time dynamically in response to a processing condition such as the load imposed on the processing resources (such as a processor and memory) of the communication control apparatus 100 or the number of processor cores available for use. The allowed calculation time may also be equal to the power allocation calculation period discussed earlier. As an example, in the standard specification of the LTE scheme specified by the 3GPP, the scheduling period in an eNodeB is implementation-dependent, and may be configured to various values, such as one subframe (=1 ms) or one radio frame (=10 ms). The allowed calculation time may also be equal to such a scheduling period.

For example, the determination unit 132 tracks changes in the number of secondary systems by monitoring activation requests and deactivation requests received from the wireless communication apparatus 20. $N_{WSD}$ represents the number of secondary systems at a base point in time, while $N_{WSD\_VAR}$ represents the variation in the number of secondary systems since the base point in time. The determination condition for switching the calculation process in the calculation unit 134 may then be expressed as follows.

[Math. 12]

$$N_{WSD}+N_{WSD\_VAR}>N_{TH} \quad (12)$$

When the conditional Expression (12) is satisfied, the determination unit 132 causes the calculation unit 134 to adjust the previously calculated transmit power on the basis of the variation $N_{WSD\_VAR}$ in the number of secondary systems.

In the margin minimization method discussed earlier, provided that $N_{Channel}$ is the number of frequency channels protected for the primary system, the number $N_{Calc}$ of individual interference quantity calculations executed when calculating the aggregated interference for all reference points is expressed by the following expression.

[Math. 13]

$$N_{Calc}=N_{Channel}\cdot N_{WSD}^2 \quad (13)$$

Furthermore, provided that $f_{clock}$ is the clock frequency of the processor, $N_{CalcPerClock}$ is the number of interference quantities that may be calculated in one clock cycle, and $D_{TH}$ is the allowed calculation time, the maximum number of interference quantities that may be calculated in the calculation time $D_{TH}$ is equal to the product of $D_{TH}$, $f_{clock}$, and $N_{CalcPerClock}$. Consequently, the determination threshold $N_{TH}$ in the conditional Expression (12) may be derived as follows.

[Math. 14]

$$N_{TH} = \sqrt{\frac{D_{TH} f_{Clock} N_{CalcPerClock}}{N_{Channel}}} \quad (14)$$

Note that Expression (14) is merely one example. For example, a margin may also be included in the determination threshold $N_{TH}$.

In a practical example, the base point in time may be the time when the transmit power was recalculated last by the calculation unit 134. In this practical example, provided that the transmit power was recalculated last at time $T_1$, for example, the determination unit 132 retains the number of secondary systems at time $T_1$ as a base value $N_{WSD}$ with a variation of zero, even if the transmit power is later adjusted at time $T_2$. In this case, even if the transmit power is roughly adjusted several times with the simple technique, adjustment error does not accumulate, and the risk of producing harmful interference caused by error accumulation is avoided.

In another practical example, the base point in time may be the immediately previous time when the transmit power was recalculated or adjusted. In this practical example, if the transmit power is adjusted at time $T_2$, the determination unit 132 retains the number of secondary systems at time $T_2$ as the base value $N_{WSD}$ with a variation of zero. In this case, since it is sufficient for the determination unit 132 to retain only the number of secondary systems from the most recent and immediately previous calculation period, the implementation of the calculation process may be simplified.

Note that the technique of simply adjusting only the interference avoidance margin on the basis of the variation in the number of secondary systems enables a result to be obtained with a small calculation cost, while sacrificing a degree of power allocation optimization. However, there exist other factors causing the risks of interference to vary besides variation in the number of secondary systems. Accordingly, the determination unit 132 additionally may determine whether to cause the calculation unit 134 to recalculate the transmit power or adjust the previously calculated transmit power, according to an additional determination condition that depends on factors other than the variation in the number of secondary systems. Herein, the factors governing the additional determination condition may be at least one from among the reference point, the frequency channel to be secondarily used, the antenna height of the device, and the interference level from other systems, for example. For example, when the degree of variation for these factors is large, the additional determination condition may be determined to be satisfied, and the interference avoidance margin may be adjusted.

(3-2) Calculation Unit

The calculation unit 134 calculates the transmit power that should be allocated to one or more secondary systems that secondarily use frequency channels protected for the primary system. In the present embodiment, as long as the above determination condition for switching the calculation process is not satisfied, the calculation unit 134 recalculates (calculates) the transmit power to be allocated to each secondary system according to the margin minimization method discussed earlier, for example. In this case, the transmit power of each secondary system may be calculated by using the nominal transmit power $P_{IB}^{SingleWSD}$ and the interference avoidance margin IM, as indicated in Expression (2).

When the above determination condition is satisfied, the calculation unit 134 adjusts the interference avoidance margin IM by calculating only the margin adjustment dM on the basis of the variation $N_{WSD\_VAR}$ in the number of secondary systems, as illustrated in Expression (7) or Expression (9). The calculation unit 134 may calculate the margin adjustment dM by substituting into Expression (7) the variation $N_{WSD\_VAR}$ in the number of secondary systems, the variation dI in the interference quantity estimated on the basis of $N_{WSD\_VAR}$, and the aggregated interference quantity $I_{Agg,max}$ at the base point in time, for example. At this point, the calculation unit 134 may also derive the estimated interference variation dI using a mapping table that defines a mapping between the variation $N_{WSD\_VAR}$ in the number of secondary systems and the estimated interference variation dI. Also, the calculation unit 134 may calculate the margin adjustment dM by substituting the number $N_{WSD}$ of secondary systems and the variation $N_{WSD\_VAR}$ thereof into Expression (9) based on the assumption that the number of secondary systems and the aggregated interference quantity are proportional, for example. In either case, calculation costs that increase on the order of the square of the number of secondary systems are not required. Compared to a technique that recalculates the transmit power for the system as a whole, the calculation of the adjustment dM of the interference avoidance margin is completed within a shorter amount of time.

When the number of secondary systems increases, or in other words when an active wireless communication apparatus 20 newly occurs, the calculation unit 134 may calculate the nominal transmit power of the secondary system operated and managed by the new wireless communication apparatus 20. The nominal transmit power $P_{IB}^{SingleWSD}$ is calculated using parameters included in the primary system information and the secondary system information, in accordance with Expression (1). Depending on the load on the calculation unit 134, the calculation of the nominal transmit power may also be entrusted to the secondary systems. For example, when the load on the calculation unit 134 is higher than a designated threshold in a certain calculation period, the calculation unit 134 may entrust the calculation of the nominal transmit power to the secondary systems. In this case, parameters for calculating the nominal transmit power may be signaled to the wireless communication apparatus 20 that is the master device of a relevant secondary system.

(3-3) Signaling Unit

The signaling unit 136 executes signaling via the communication unit 110 with the primary transceiver 10, control nodes on the core network 15, the wireless communication apparatus 20, and other data servers. For example, every time the calculation unit 134 recalculates the transmit power to allocate to each secondary system or adjusts the interference avoidance margin, power allocation-related information is reported to the wireless communication apparatus 20 that is the master device of an active secondary system.

As an example, according to Expression (2), the transmit power $P_{IB}^{WSD}$ allocated to each secondary system includes the nominal transmit power $P_{IB}^{SingleWSD}$ and the interference avoidance margin IM. Whereas the nominal transmit power $P_{IB}^{SingleWSD}$ is different for each system, the interference avoidance margin IM is shared in common for multiple secondary systems. In the calculation period in which the interference avoidance margin IM is adjusted, or in other words, in the calculation period in which the changed number of secondary systems satisfies the conditional Expression (12), the nominal transmit power $P_{IB}^{SingleWSD}$ is not updated, and only the margin adjustment dM indicated in Expression (6) is calculated. In this case, the signaling unit 136 signals only the adjustment dM of the interference avoidance margin calculated by the calculation unit 134 to existing secondary systems. Consequently, the signaling overhead is reduced. To the new secondary systems, the signaling unit 136 signals the adjustment dM of the interference avoidance margin, as well as the interference avoidance margin $IM_{Base}$ and the nominal transmit power $P_{IB}^{SingleWSD}$ that were reported to the existing secondary systems at the previous base point in time. The wireless communication apparatus 20 which is the master device of a secondary system derives the adjusted interference avoidance margin IM' by adding together the interference avoidance margin $IM_{Base}$ from the base point in time and the margin adjustment dM. Note that the signaling unit 136 may also signal the adjusted interference avoidance margin IM' to both the existing secondary systems and the new secondary systems. Additionally, the signaling unit 136 may also signal the allocated transmit power $P_{IB}^{WSD}$ to the secondary systems at some timing.

When the calculation of the nominal transmit power is entrusted to the secondary system according to the load on the calculation unit 134, the signaling unit 136 signals parameters for calculating the nominal transmit power to the new secondary systems. The parameters for calculating the nominal transmit power may include one or more from among the position of the primary transceiver, the list of frequency channels available for use, the minimum receiving sensitivity of the primary terminals, the protection ratio, the shadowing margin, and the total number of secondary systems ($N_{WSD}+N_{WSD\_VAR}$), for example. In this case, the transmit power is calculated by the wireless communication apparatus 20 itself which is the master device of a new secondary system. The signaling unit 136 may also receive a report of the nominal transmit power calculation result from the wireless communication apparatus 20, and store the report in the storage unit 120.

In the calculation period in which the transmit power is recalculated, or in other words, in the calculation period in which the changed number of secondary systems does not satisfy the conditional Expression (12), the nominal transmit power $P_{IB}^{SingleWSD}$ possibly may be updated. Additionally, the interference avoidance margin IM is also recalculated. The signaling unit 136 signals the recalculated nominal transmit power $P_{IB}^{SingleWSD}$ and the interference avoidance margin IM to the existing secondary systems and the new secondary systems. The interference avoidance margin IM reported at this point may be treated as a base value for later adjustment of the interference avoidance margin. For existing secondary systems, the signaling of the nominal transmit power to the existing secondary systems may also be omitted when the nominal transmit power is not updated. Additionally, the signaling to the existing secondary systems may also be conducted by transmitting a difference only.

A signaling message by which the signaling unit 136 reports power allocation-related information to the wireless communication apparatus 20 may also include an index indicating the type of parameters being reported. For example, parameter types may be defined as follows.

0: Interference avoidance margin (IM) *may also be used as base value $IM_{Base}$
1: Margin adjustment (dM)
2: Interference avoidance margin and margin adjustment (IM, dM)
3: Adjusted margin (IM'=$IM_{Base}$+dM)
4: Allocated transmit power The values of the parameter types are not limited to the above example, and may also be other values. By introducing such an index into the signaling message, it becomes possible for the communication control system 1 to support a variety of signaling variations, and select an optimal signaling method from the perspective of reducing overhead, reducing the complexity of the implementation, or the like.

As described using FIG. 3, the communication control apparatus 100 may also be a data server having the authority to allocate transmit power to one or more secondary systems inside a geographical region 3a, for example. However, when allocating transmit power, situations demanding the consideration of the presence of secondary systems inside a neighboring region 3b that neighbors the geographical region 3a may also exist. An example of such a situation is when a large number of secondary systems or a secondary system that uses a comparatively large transmit power is operated near the region border. In this case, the signaling unit 136 may acquire information indicating the number of secondary systems that should be considered inside the neighboring region 3b from another data server having the authority to allocate transmit power to secondary systems for the neighboring region 3b. At this point, suppose that $N_{WSD\_A}$ is the number of secondary systems inside the geographical region 3a, and $N_{WSD\_B}$ is the number of secondary systems that should be considered, which is acquired from another data server. When these values satisfy the following conditional Express (15), the assumed calculation time for recalculating the transmit power by the calculation unit 134 will exceed the allowed calculation time.

[Math. 15]

$$N_{WSD\_A} + N_{WSD\_B} > N_{TH} \qquad (15)$$

A comparison of the condition Expression (12) and the conditional Expression (15) shows that the number of secondary systems $N_{WSD\_A}$ means the base value $N_{WSD}$ of the number of secondary systems, while the number of secondary systems $N_{WSD\_B}$ means the variation $N_{WSD\_VAR}$ in secondary systems in the spatial direction. When the determination condition of the conditional Expression (15) is satisfied, the determination unit 132 causes the calculation unit 132 to adjust the interference avoidance margin IM included in the transmit power previously calculated by considering only the geographical region 3a on the basis of the variation $N_{WSD\_B}$ in the number of secondary systems. Since the number of secondary systems $N_{WSD\_B}$ is positive, Expression (7) may be transformed as follows.

[Math. 16]

$$dM = 10\log_{10}\left(\frac{N_{WSD\_A} + N_{WSD\_B}}{N_{WSD\_A}} \cdot \frac{Y + 10^{\frac{dI}{10}}}{Y}\right) \quad (16)$$

where $Y = 10^{\frac{I_{Agg\_max}}{10}}$

In this way, according to the present embodiment, even in a situation demanding the consideration of the presence of secondary systems inside a neighboring region, it is sufficient for the communication control apparatus 100 simply to acquire only the number of secondary systems that should be considered from a device having authority for the relevant neighboring region. The communication control apparatus 100, by adjusting the interference avoidance margin using the acquired number of secondary systems, is able to give communication opportunities to secondary systems promptly, while also appropriately protecting the primary system. Note that the signaling unit 136 may also acquire other parameters, such as the estimated interference variation dI, from the device having authority for the neighboring region.

3-2. Modifications

When the variation $N_{WSD\_VAR}$ in the number of secondary systems is small, the margin adjustment dM is also small. In such cases, if the margin adjustment dM is signaled every time the number of secondary systems changes, the signaling overhead in the communication control system 1 becomes very large, possibly causing a drop in resource utilization efficiency. Accordingly, this section describes techniques for reducing the overhead of power allocation signaling as modifications of the embodiment discussed above.

(1) First Modification

In the first modification, the margin for reducing signaling overhead proposed in Patent Literature 2 is introduced. The calculation unit 134 calculates a transmit power $P_{Alloc}^{WSD}$ to be allocated to each secondary system by using a signaling reduction margin $M_{int}$ in addition to the nominal transmit power $P_{IB}^{SingleWSD}$ and the interference avoidance margin IM, as in the following expression.

[Math. 17]

$$P_{Alloc}^{WSD} = P_{IB}^{WSD} - M_{Int} \leq P_{IB}^{SingleWSD} - IM - M_{Int} \quad (17)$$

When the number of secondary systems increases, if the total number of secondary systems exceeds the determination threshold Nm, the calculation unit 134 calculates the adjustment dM of the interference avoidance margin IM in Expression (17) on the basis of the variation $N_{WSD\_VAR}$ in the number of secondary systems. At this point, when the following conditional Expression (18) is satisfied, harmful interference does not occur, even if the secondary systems continually use the already-allocated transmit power $P_{Alloc}^{WSD}$. Note that the right side of the conditional Expression (18) is equal to the already-allocated transmit power $P_{Alloc}^{WSD}$.

[Math. 18]

$$P_{IB}^{SingleWSD} - (IM + dM) \geq P_{IB}^{SingleWSD} - IM - M_{Int} \quad (18)$$

The condition Expression (18) may be transformed equivalently as follows.

[Math. 19]

$$IM + dM \leq IM + M_{Int}$$

$$dM \leq M_{Int} \quad (19)$$

Accordingly, when the adjustment dM of the interference avoidance margin for existing secondary systems falls below the signaling reduction margin $M_{Int}$ included in the already-allocated transmit power, the signaling unit 136 does not signal the margin adjustment dM to the relevant existing secondary systems.

Likewise, when the number of secondary systems decreases, if the total number of secondary systems exceeds the determination threshold $N_{TH}$, the calculation unit 134 calculates the adjustment dM of the interference avoidance margin IM in Expression (17) on the basis of the variation $N_{WSD\_VAR}$ in the number of secondary systems. At this point, when the following conditional Expression (20) is satisfied, the throughput improvement obtained by adjusting the transmit power of the secondary systems is small.

[Math. 20]

$$|dM| \leq M_{TH\_Int} \quad (20)$$

Herein, $M_{TH\_Int}$ is a threshold for reducing signaling overhead that may be configured in advance. When the absolute value of the adjustment dM of the interference avoidance margin for existing secondary systems falls below the threshold $M_{TH\_Int}$ for reducing signaling overhead, the signaling unit 136 does not signal the margin adjustment dM to the relevant existing secondary systems.

(2) Second Modification

In the second modification, instead of performing strict tracking of the number of secondary systems, a type of hysteresis control is introduced to thereby reduce the number of times power allocation is calculated. When adjusting the transmit power, the calculation unit 134 calculates the margin adjustment dM by setting the variation $N_{WSD\_VAR}$ in the number of secondary systems to a greater-than-actual virtual value $N'_{WSD\_VAR}$, as in the following expression.

[Math. 21]

$$dM = 10\log_{10}\left(\frac{N_{WSD} + N'_{WSD\_VAR}}{N_{WSD}} \cdot \frac{Y + \text{sgn}(N'_{WDS\_VAR}) \cdot 10^{\frac{dI}{10}}}{Y}\right) \quad (21)$$

After that, even if the number of secondary systems increases, as long as the total number of secondary systems ($N_{WSD}+N_{WSD\_VAR}$) does not exceed the virtual value ($N_{WSD}+N_{WSD\_VAR'}$), the calculation unit 134 does not have to execute adjustment of the interference avoidance margin. Consequently, signaling to each secondary system is made less frequent. The virtual value $N_{WSD\_VAR'}$ may be configured statically in advance, or configured dynamically. For example, the calculation unit 134 may retain maximum numbers of secondary systems managed by the communication control apparatus 100 at different times as a history of communication, and configure the virtual value $N_{WSD\_VAR'}$ so that the virtual number of secondary systems ($N_{WSD}+N_{WSD\_VAR'}$) becomes equal to the relevant maximum number. Consequently, since a larger interference avoidance margin is calculated proactively before the number of secondary systems increases, transmit power may be allocated to new secondary systems promptly, without exerting harmful interference on the primary system. A period of validity may also be configured for the virtual value $N_{WSD\_VAR'}$. In this case, after the period of validity has passed, the calculation unit 134 may execute adjustment of the interference avoidance margin (or recalculation of the transmit power) irrespectively of the virtual value $N_{WSD\_VAR'}$, and signal the power allocation result to the secondary systems.

Likewise, in the case in which the number of secondary systems decreases, as long as the absolute value $|N_{WSD\_VAR}|$ of the variation in the number of secondary systems does not exceed a designated threshold, the calculation unit 134 does not have to execute adjustment of the interference avoidance margin.

4. Process Flows

In this section, several examples of the flows of processes that may be executed by the communication control apparatus 100 according to the foregoing embodiment will be described.

4-1. Power Distribution Process (1) First Example

Figure 7A:
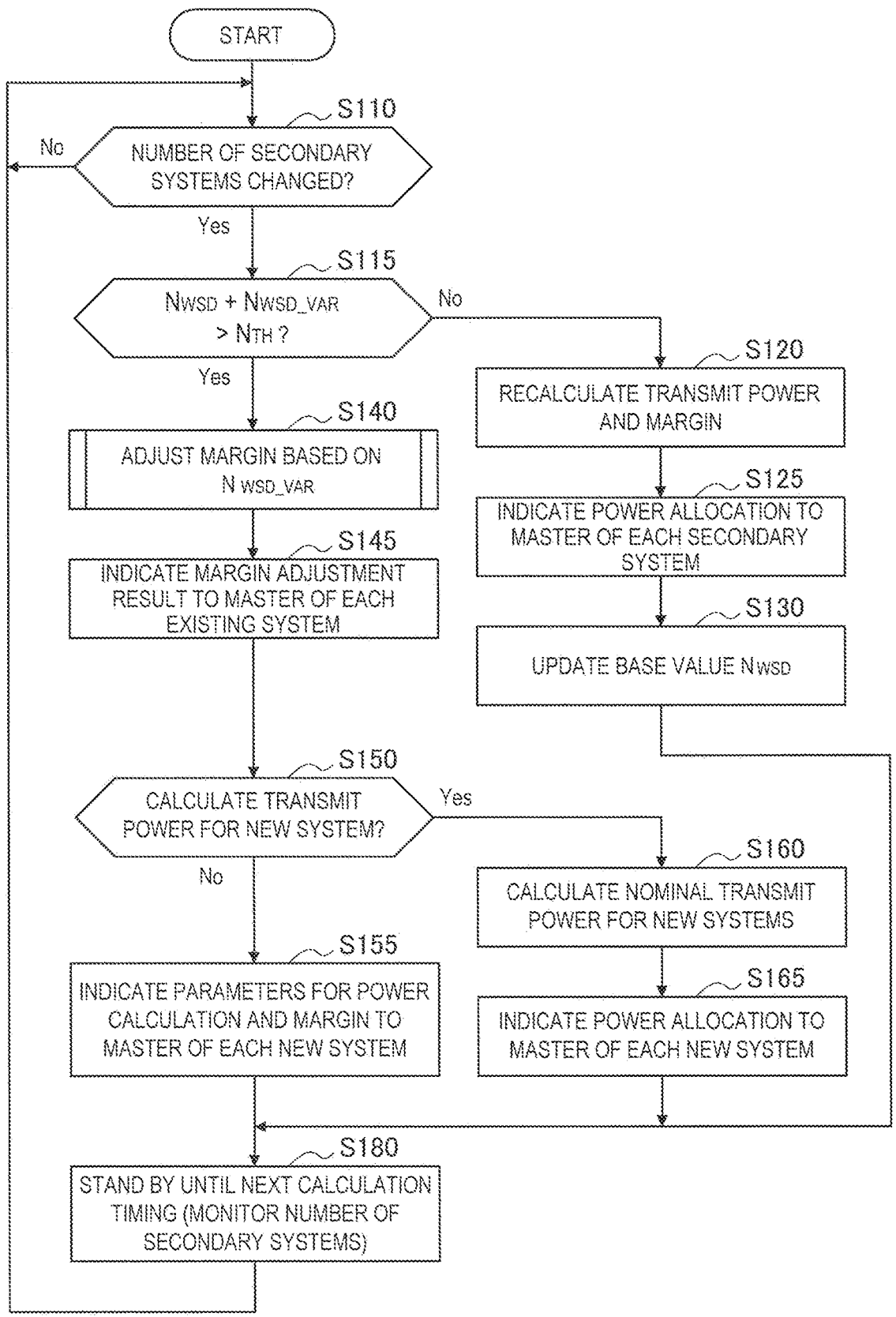
FIG. 7A is a flowchart illustrating a first example of the flow of a power distribution process according to an embodiment.

FIG. 7A is a flowchart illustrating a first example of the flow of a power distribution process according to an embodiment. In the first example, the time at which the transmit power was recalculated last by the calculation unit 134 is treated as the base point in time for the variation in the number of secondary systems.

Referring to FIG. 7A, first, the determination unit 132 stands by a change in the number of secondary systems (step S110). Subsequently, when the number of secondary systems changes, the process proceeds to step S115.

Next, the determination unit 132 determines whether the changed number of secondary systems ($N_{WSD}+N_{WSD\_VAR}$) exceeds the determination threshold $N_{TH}$ (step S115). If the changed number of secondary systems does not exceed the determination threshold, the process proceeds to step S120. On the other hand, if the changed number of secondary systems exceeds the determination threshold, the process proceeds to step S140.

In step S120, the calculation unit 134 recalculates the nominal transmit power and the interference avoidance margin according to the power distribution method described in Patent Literature 1 or the margin minimization method described in Non-Patent Literature 2 (step S120). Subsequently, the signaling unit 136 reports the recalculated nominal transmit power and interference avoidance margin to the wireless communication apparatus 20 which is the master device of each of the existing secondary systems and the new secondary systems (step S125). Also, the calculation unit 134 updates the base value $N_{WSD}$ of the number of secondary systems and the maximum aggregated interference quantity $I_{Agg,max}$ at the base point in time to the most recent values (step S130).

In step S140, the calculation unit 134 adjusts the interference avoidance margin IM by calculating the adjustment dM of the interference avoidance margin on the basis of the variation $N_{WSD\_VAR}$ in the number of secondary systems (step S140). Subsequently, the signaling unit 136 reports the margin adjustment dM calculated by the calculation unit 134 to the wireless communication apparatus 20 which is the master device of each of the existing secondary systems (step S145).

Furthermore, the calculation unit 134 determines whether to calculate the nominal transmit power for the new secondary systems, depending on the load at the time (step S150). For example, when the load on the calculation unit 134 is relatively high, the calculation of the nominal transmit power is entrusted to the secondary systems. In this case, the signaling unit 136 reports parameters for calculating the nominal transmit power, the interference avoidance margin and the adjustment thereof to the wireless communication apparatus 20 which is the master device of each of the new secondary systems (step S155). On the other hand, when the load on the calculation unit 134 is relatively low, the calculation of the nominal transmit power is not entrusted to the secondary systems. In this case, the calculation unit 134 calculates the nominal transmit power for the new secondary systems (step S160). Subsequently, the signaling unit 136 reports the nominal transmit power, the interference avoidance margin and the adjustment thereof to the wireless communication apparatus 20 which is the master device of each of the new secondary systems (step S165).

After that, during the period until the next calculation timing arrives, variation in the number of secondary systems is monitored by the determination unit 132, and the process returns to step S110 (step S180).

(2) Second Example

Figure 7B:
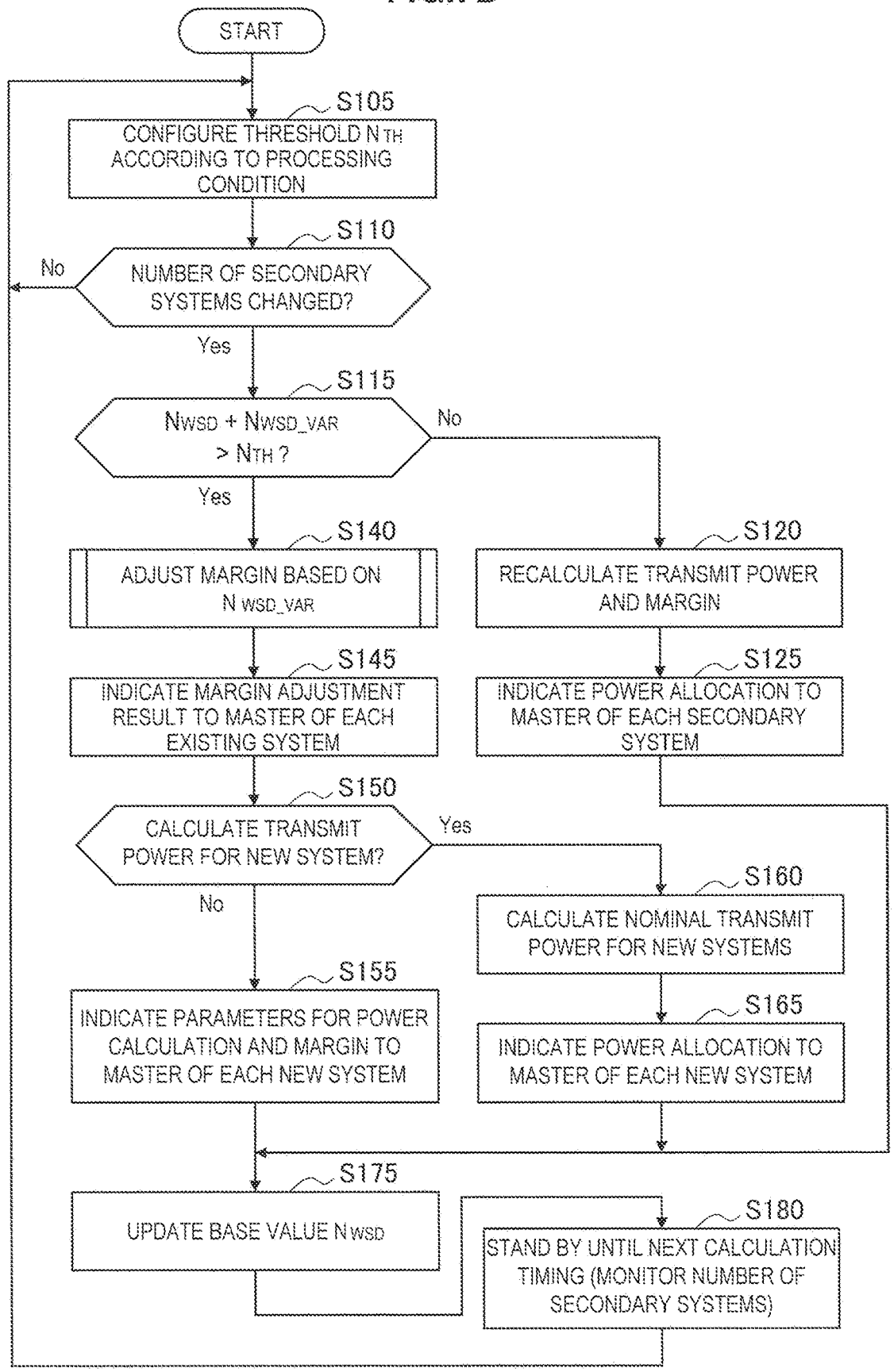
FIG. 7B is a flowchart illustrating a second example of the flow of a power distribution process according to an embodiment.

FIG. 7B is a flowchart illustrating a second example of the flow of a power distribution process according to an embodiment. In the second example, the immediately previous time at which the transmit power was recalculated or adjusted is treated as the base point in time for the variation in the number of secondary systems. Also, the determination threshold $N_{TH}$ is configured dynamically. Note that the configuration is not limited to such an example, and the determination threshold $N_{TH}$ may be configured dynamically in the first example, or the determination threshold $N_{TH}$ may be configured statically in advance in the second example.

Referring to FIG. 7B, first, the determination unit 132 configures the determination threshold $N_{TH}$ according to a processing condition such as the load imposed on the processing resources of the communication control apparatus 100 or the number of processor cores available for use (step S105). Also, the determination unit 132 stands by for a change in the number of secondary systems (step S110). Subsequently, when the number of secondary systems changes, the process proceeds to step S115.

Next, the determination unit 132 determines whether the changed number of secondary systems ($N_{WSD}+N_{WSD\_VAR}$)

exceeds the determination threshold $N_{TH}$ (step S115). If the changed number of secondary systems does not exceed the determination threshold, the process proceeds to step S120. On the other hand, if the changed number of secondary systems exceeds the determination threshold, the process proceeds to step S140.

In step S120, the calculation unit 134 recalculates the nominal transmit power and the interference avoidance margin according to the power distribution method described in Patent Literature 1 or the margin minimization method described in Non-Patent Literature 2 (step S120). Subsequently, the signaling unit 136 reports the recalculated nominal transmit power and interference avoidance margin to the wireless communication apparatus 20 which is the master device of each of the existing secondary systems and the new secondary systems (step S125).

In step S140, the calculation unit 134 adjusts the interference avoidance margin IM by calculating the adjustment dM of the interference avoidance margin on the basis of the variation $N_{WSD\_VAR}$ in the number of secondary systems (step S140). Subsequently, the signaling unit 136 reports the margin adjustment dM calculated by the calculation unit 134 to the wireless communication apparatus 20 which is the master device of each of the existing secondary systems (step S145).

Furthermore, the calculation unit 134 determines whether to calculate the nominal transmit power for the new secondary systems, depending on the load at the time (step S150). For example, when the load on the calculation unit 134 is relatively high, the signaling unit 136 reports parameters for calculating the nominal transmit power, the interference avoidance margin and the adjustment thereof to the wireless communication apparatus 20 which is the master device of each of the new secondary systems (step S155). On the other hand, when the load on the calculation unit 134 is relatively low, the calculation unit 134 calculates the nominal transmit power for the new secondary systems (step S160). Subsequently, the signaling unit 136 reports the nominal transmit power, the interference avoidance margin and the adjustment thereof to the wireless communication apparatus 20 which is the master device of each of the new secondary systems (step S165).

After that, the calculation unit 132 updates the base value Nwso of the number of secondary systems and the maximum aggregated interference quantity $I_{Agg,max}$ at the base point in time to the most recent values (step S175). Subsequently, during the period until the next calculation timing arrives, variation in the number of secondary systems is monitored by the determination unit 132, and the process returns to step S105 (step S180).

(3) Third Example

Figure 7C:
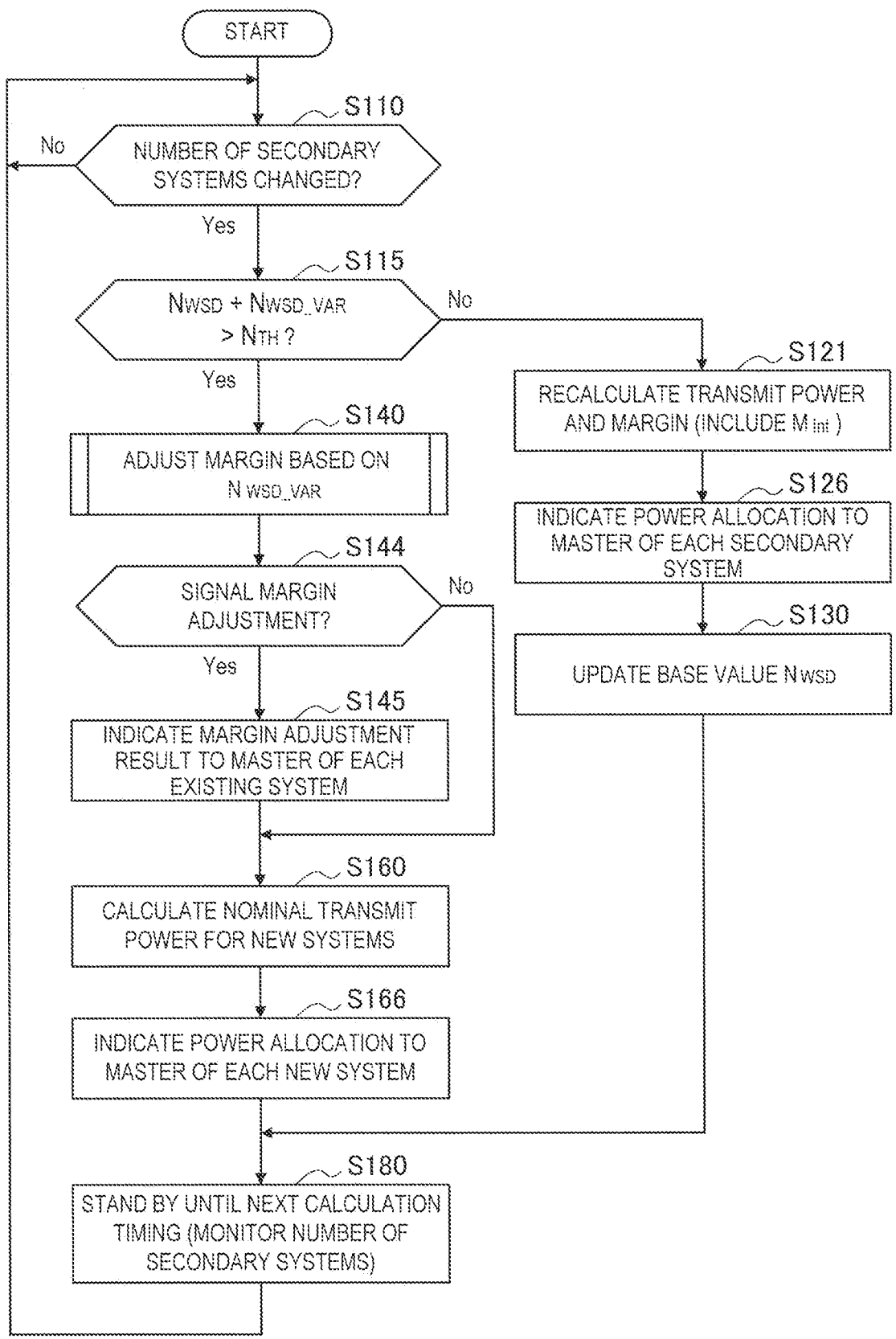
FIG. 7C is a flowchart illustrating a third example of the flow of a power distribution process according to an embodiment.

FIG. 7C is a flowchart illustrating a third example of the flow of a power distribution process according to an embodiment. In the third example, the time at which the transmit power was recalculated last by the calculation unit 334 is treated as the base point in time for the variation in the number of secondary systems, similarly to the first example. In the third example, the technique of reducing signaling overhead described as the first modification in the previous section is introduced.

Referring to FIG. 7C, first, the determination unit 132 stands by a change in the number of secondary systems (step S110). Subsequently, when the number of secondary systems changes, the process proceeds to step S115.

Next, the determination unit 132 determines whether the changed number of secondary systems exceeds the determination threshold (step S115). If the changed number of secondary systems does not exceed the determination threshold, the process proceeds to step S121. On the other hand, if the changed number of secondary systems exceeds the determination threshold, the process proceeds to step S140.

In step S121, the calculation unit 134 recalculates the nominal transmit power and the interference avoidance margin according to the power distribution method described in Patent Literature 1 or the margin minimization method described in Non-Patent Literature 2. For recalculation, the signaling reduction margin $M_{Int}$ is also introduced (step S121). Subsequently, the signaling unit 136 reports the recalculated nominal transmit power and margin to the wireless communication apparatus 20 which is the master device of each of the existing secondary systems and the new secondary systems (step S126). Also, the calculation unit 132 updates the base value $N_{WSD}$ of the number of secondary systems and the maximum aggregated interference quantity $I_{Agg,max}$ at the base point in time to the most recent values (step S130).

In step S140, the calculation unit 134 adjusts the interference avoidance margin by calculating the adjustment of the interference avoidance margin on the basis of the variation in the number of secondary systems (step S140). Subsequently, the signaling unit 136 determines whether the margin adjustment calculated by the calculation unit 134 should be signaled (step S144). For example, when the margin adjustment dM does not satisfy the condition Expression (19) or the conditional Expression (20) discussed earlier, the signaling unit 136 may determine that the margin adjustment dM should be signaled. If it is determined that the margin adjustment dM should be signaled, the signaling unit 136 reports the margin adjustment calculated by the calculation unit 134 to the wireless communication apparatus 20 which is the master device of each of the existing secondary systems (step S145).

Furthermore, the calculation unit 134 calculates the nominal transmit power for the new secondary systems (step S160). Subsequently, the signaling unit 136 reports the nominal transmit power, the interference avoidance margin, the margin adjustment, and the signaling reduction margin to the wireless communication apparatus 20 which is the master device of each of the new secondary systems (step S166).

After that, during the period until the next calculation timing arrives, variation in the number of secondary systems is monitored by the determination unit 132, and the process returns to step S110 (step S180).

(4) Fourth Example

Figure 7D:
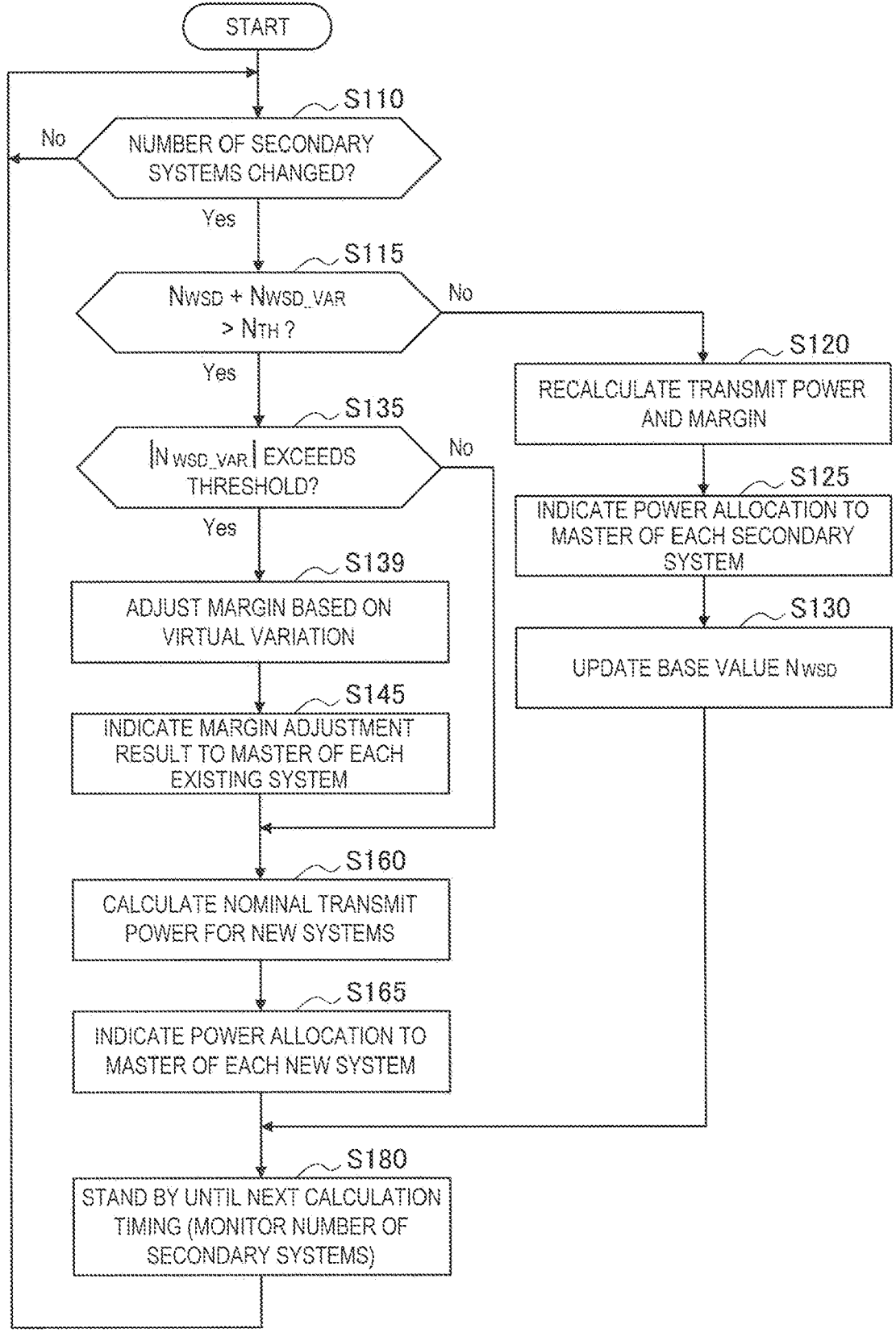
FIG. 7D is a flowchart illustrating a fourth example of the flow of a power distribution process according to an embodiment.

FIG. 7D is a flowchart illustrating a fourth example of the flow of a power distribution process according to an embodiment. In the fourth example, the technique of reducing signaling overhead described as the second modification in the previous section is introduced.

Referring to FIG. 7D, first, the determination unit 132 stands by a change in the number of secondary systems (step S110). Subsequently, when the number of secondary systems changes, the process proceeds to step S115.

Next, the determination unit 132 determines whether the changed number of secondary systems exceeds the determination threshold (step S115). If the changed number of secondary systems does not exceed the determination threshold, the process proceeds to step S120. On the other hand, if the changed number of secondary systems exceeds the determination threshold, the process proceeds to step S135.

In step S120, the calculation unit 134 recalculates the nominal transmit power and the interference avoidance margin according to the power distribution method described in Patent Literature 1 or the margin minimization method described in Non-Patent Literature 2 (step S120). Subsequently, the signaling unit 136 reports the recalculated nominal transmit power and interference avoidance margin to the wireless communication apparatus 20 which is the master device of each of the existing secondary systems and the new secondary systems (step S125). Also, the calculation unit 132 updates the base value $N_{WSD}$ of the number of secondary systems and the maximum aggregated interference quantity $I_{Agg,max}$ at the base point in time to the most recent values (step S130).

In step S135, the determination unit 132 additionally compares the absolute value of the variation in the number of secondary systems to a threshold value (step S135). The threshold value at this point may be the virtual variation $N_{WSD\_VAR'}$. In addition, different threshold values for the case of an increase and the case of a decrease may be used. If the absolute value of the variation in the number of secondary systems exceeds the threshold value, the calculation unit 134 adjusts the interference avoidance margin by calculating the adjustment of the interference avoidance margin on the basis of the virtual variation in the number of secondary systems (step S139). Subsequently, the signaling unit 136 reports the margin adjustment calculated by the calculation unit 134 to the wireless communication apparatus 20 which is the master device of each of the existing secondary systems (step S145). If the absolute value of the variation in the number of secondary systems does not exceed the threshold value, these steps S140 and S145 are skipped.

Furthermore, the calculation unit 134 calculates the nominal transmit power for the new secondary systems (step S160). Subsequently, the signaling unit 136 reports the nominal transmit power, the interference avoidance margin, and the margin adjustment to the wireless communication apparatus 20 which is the master device of each of the new secondary systems (step S165).

After that, during the period until the next calculation timing arrives, variation in the number of secondary systems is monitored by the determination unit 132, and the process returns to step S110 (step S180).

4-2. Margin Adjustment Process

Figure 8:
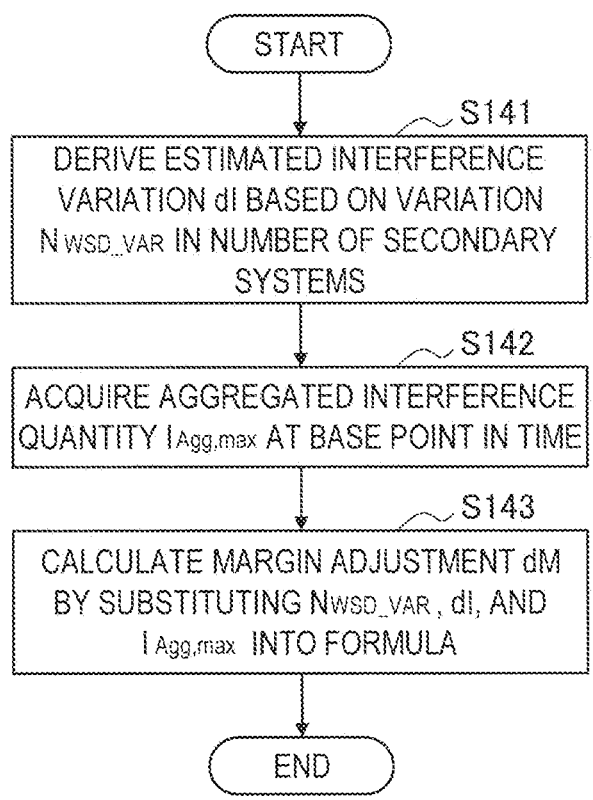
FIG. 8 is a flowchart illustrating an example of the flow of a margin adjustment process which may be executed during the power distribution process illustrated in FIGS. 7A to 7C.

FIG. 8 is a flowchart illustrating an example of the flow of a margin adjustment process (corresponding to step S140) which may be executed during the power distribution process illustrated in FIGS. 7A to 7C.

Referring to FIG. 8, first, the calculation unit 134 derives the estimated interference variation dI on the basis of the variation $N_{WSD\_VAR}$ in the number of secondary systems (step S141). Next, the calculation unit 134 acquires the aggregated interference quantity $I_{Agg,max}$ at the base point in time from the storage unit 120 (step S142). Subsequently, the calculation unit 134 computes the margin adjustment dM by substituting the variation $N_{WSD\_VAR}$ in the number of secondary systems, the estimated interference variation dI, and the aggregated interference quantity $I_{Agg,max}$ into Expression (7) (step S143).

Note that when Expression (9) is used based on the assumption that the number of secondary systems and the aggregated interference quantity are proportional, the derivation of the estimated interference variation dI and the substitution of dI into the formula may also be omitted.

4-3. Signaling Sequence

Figure 9A:
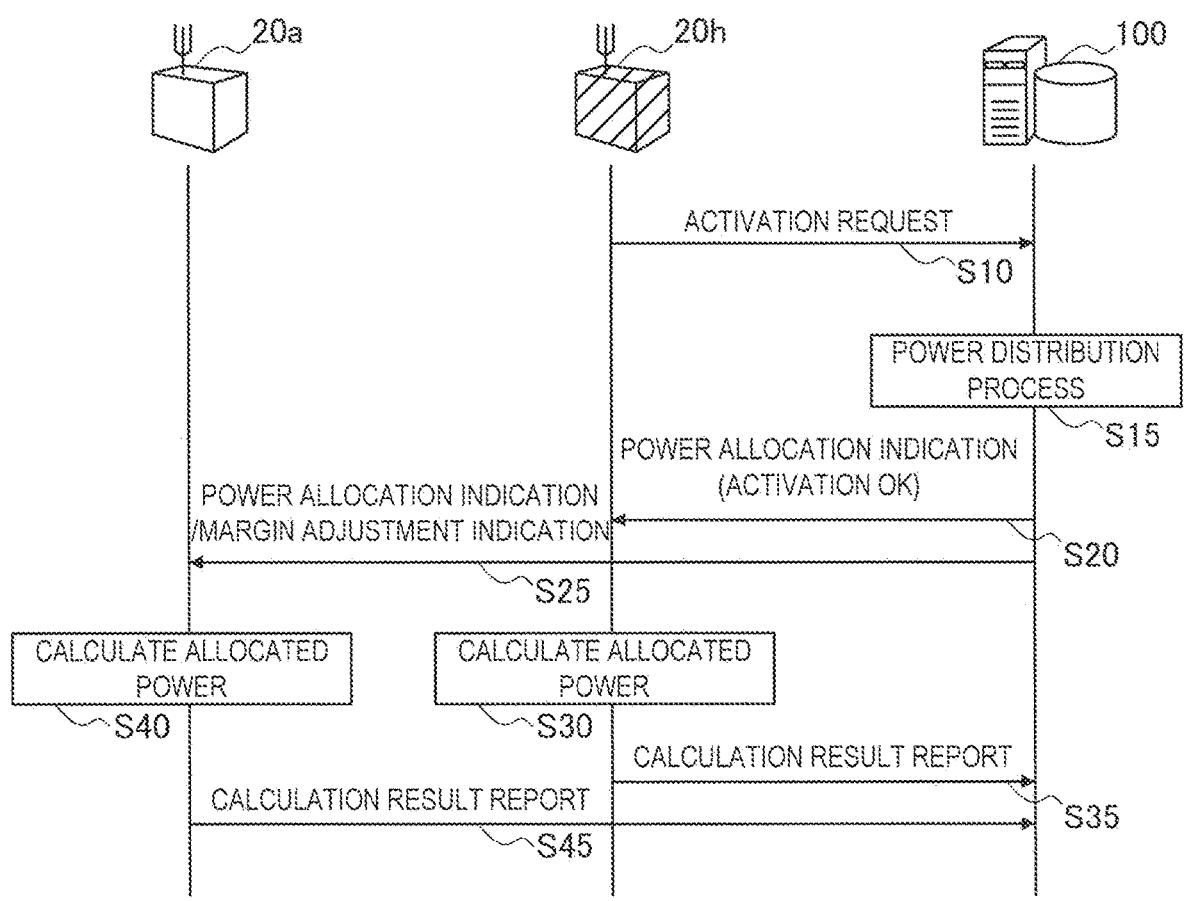
FIG. 9A is a first sequence diagram illustrating an example of a signaling sequence in a system according to an embodiment.

FIGS. 9A and 9B illustrate an example of a signaling sequence in the communication control system 1 according to an embodiment. In the sequence of FIG. 9A, the communication control apparatus 100, a wireless communication apparatus 20a which is the master device of an existing secondary system, and a wireless communication apparatus 20h which is the master device of a new secondary system participate. Note that only the wireless communication apparatuses 20a and 20h are illustrated herein for the sake of simplicity, but in actual practice, the communication control system 1 is assumed to include more wireless communication apparatuses 20.

Referring to FIG. 9A, first, the wireless communication apparatus 20h transmits an activation request to the communication control apparatus 100 (step S10). Upon receiving the activation request from the wireless communication apparatus 20h, the communication control apparatus 100 counts up the number of secondary systems.

When a periodic calculation timing arrives, the communication control apparatus 100 executes the power distribution process described using FIGS. 7A to 7D (step S15). As a result, the transmit power that should be allocated to the secondary system is recalculated, or the previously calculated transmit power is adjusted on the basis of the variation in the number of secondary systems.

The communication control apparatus 100 indicates that activation is allowed, and also signals the power allocation result to the wireless communication apparatus 20h (step S20). In addition, the communication control apparatus 100 signals the power allocation result or the margin adjustment result to the wireless communication apparatus 20a (step S20).

The wireless communication apparatus 20h calculates the transmit power allocated to the new secondary system by using the power allocation result indicated by the communication control apparatus 100 (step S30). Additionally, the wireless communication apparatus 20h may report the calculated allocated transmit power to the communication control apparatus 100 (step S35).

The wireless communication apparatus 20a calculates the recalculated or adjusted allocated transmit power by using the power allocation result of the margin adjustment result indicated by the communication control apparatus 100 (step S40). Additionally, the wireless communication apparatus 20a may report the calculated allocated transmit power to the communication control apparatus 100 (step S45).

Referring to FIG. 9B, there are illustrated a data server having the authority to allocate transmit power for a neighboring region 3b neighboring the geographical region 3a that includes the communication control apparatus 100, the wireless communication apparatus 20a, and the wireless communication apparatus 20h, and a wireless communication apparatus inside the neighboring region 3b.

In a situation demanding the consideration of the presence of the secondary system inside the neighboring region 3b, the number of secondary systems that should be considered is signaled to the communication control apparatus 100 from the data server having authority for the neighboring region 3b (step S50). The number of secondary systems signaled at this point corresponds to the parameter $N_{WSD\_B}$ in Expression (15) and Expression (16) discussed earlier, and is treated as a variation in the number of secondary systems.

The communication control apparatus 100 executes the power distribution process using the number $_{WSD\_A}$ of secondary systems inside the geographical region 3a and the number $N_{WSD\_B}$ of secondary systems that should be considered inside the neighboring region 3b (step S55). As a result, the transmit power that should be allocated to the secondary system is recalculated, or the previously calculated transmit power is adjusted on the basis of $N_{WSD\_B}$.

The communication control apparatus 100 signals the power allocation result or the margin adjustment result to the wireless communication apparatus 20a and the wireless communication apparatus 20h (steps S60, S65).

The wireless communication apparatus 20h calculates the recalculated or adjusted allocated transmit power by using the power allocation result of the margin adjustment result indicated by the communication control apparatus 100 (step S70). Additionally, the wireless communication apparatus 20h may report the calculated allocated transmit power to the communication control apparatus 100 (step S75).

Similarly, the wireless communication apparatus 20a calculates the recalculated or adjusted allocated transmit power by using the power allocation result of the margin adjustment result indicated by the communication control apparatus 100 (step S80). Additionally, the wireless communication apparatus 20a may report the calculated allocated transmit power to the communication control apparatus 100 (step S85).

5. Exemplary Configuration of Wireless Communication Apparatus

FIG. 10 is a block diagram illustrating an example of a logical configuration of the wireless communication apparatus 20 according to an embodiment. Referring to FIG. 10, the wireless communication apparatus 20 includes a wireless communication unit 210, a network communication unit 220, a storage unit 230, and a communication control unit 240.

(1) Wireless Communication Section

The wireless communication unit 210 executes wireless communication with terminal devices positioned nearby (slave devices of the secondary system) using transmit power allocated by the communication control apparatus 100. For example, the wireless communication unit 210 transmits a beacon signal on one of the frequency channels available for use as indicated by the communication control apparatus 100. Upon sensing the beacon signal, a slave device exchanges parameters for the operation and management of the secondary system with the wireless communication apparatus 20, and initiates wireless communication. The parameters exchanged at this point may include parameters for controlling the transmit power of the slave device (for example, a value of transmit power).

(2) Network Communication Unit

The network communication unit 220 establishes backhauling between the wireless communication apparatus 20 and the communication control apparatus 100. Subsequently, the network communication unit 220 receives various signaling messages transmitted from the communication control apparatus 100 over backhauling. In addition, the network communication unit 220 transmits secondary system information about the secondary system operated and managed by the wireless communication apparatus 20 to the communication control apparatus 100. Note that when the backhauling is a wireless link, the network communication unit 220 may be omitted from the configuration of the wireless communication apparatus 20.

(3) Storage Unit

The storage unit 230 uses a storage medium such as a hard disk or semiconductor memory to store programs and data for the operation of the wireless communication apparatus 20. Data stored by the storage unit 230 may include secondary system information about the secondary system operated and managed by the wireless communication apparatus 20, power allocation-related information indicated by the communication control apparatus 100, and slave device information, for example.

(4) Communication Control Unit

The communication control unit 240 controls communication executed by the wireless communication apparatus 20. For example, when the wireless communication apparatus 20 starts the operation and management of the secondary system (or returns from sleep mode), the communication control unit 240 transmits an activation request to the communication control apparatus 100 via backhauling. Subsequently, if power allocation-related information is received from the communication control apparatus 100, the operating frequency and transmit power for the wireless communication unit 210 are configured in accordance with the transmit power allocation by the communication control apparatus 100.

Consequently, wireless communication becomes possible between the wireless communication apparatus 20 which acts as the master device, and one or more slave devices. The maximum transmit power usable by the wireless communication unit 210 may be calculated by subtracting the interference avoidance margin (and if necessary, the signaling reduction margin) from the nominal transmit power indicated by the communication control apparatus 100. If a signaling message indicating an adjustment of the interference avoidance margin is received from the communication control apparatus 100, the communication control unit 240 updates the configuration of the transmit power in the wireless communication unit 210 by adding the margin adjustment to the margin included in the already-configured transmit power. When the operation and management of the secondary system is stopped (or transitioned to sleep mode), the communication control unit 240 transmits a deactivation request to the communication control apparatus 100 via backhauling. Consequently, the communication control apparatus 100 is able to recognize a decrease in secondary systems.

6. Another Example of System Model

FIG. 1 illustrates a system model in which a communication control apparatus 100 that may correspond to a GLDB is deployed in the communication control system 1, and in which the communication control apparatus 100 executes power calculation and signaling with secondary systems. However, such a system model is merely one example. For example, the functions of the communication control apparatus 100 discussed above may also be realized by two or more hierarchically separated entities.

Figure 11:
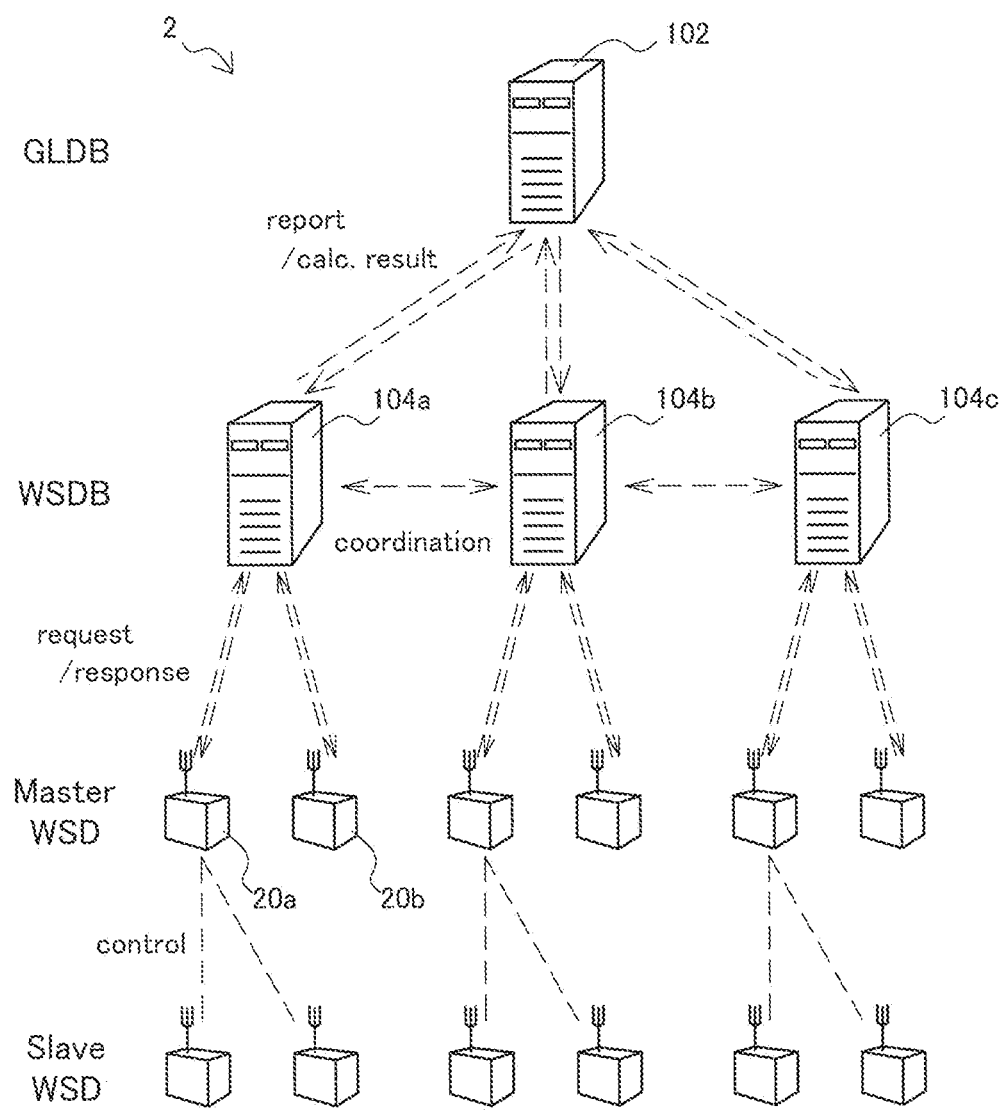
FIG. 11 is an explanatory diagram for describing another example of a system model.

FIG. 11 is an explanatory diagram for describing another example of a system model. Referring to FIG. 11, the communication control system 2 includes a GLDB 102, one or more white space databases (WSDBs) 104a, 104b, and so on, one or more master WSDs 20a, 20b, and so on, and one or more slave WSDs. The GLDB 102 includes, from among the functions of the communication control apparatus 100 discussed earlier, the calculation function primarily used for power allocation and the function of switching between power recalculation and adjustment according to the determination condition discussed earlier. In addition, the GLDB 102 also includes a function of communicating with other entities, which may include the WSDBs 104a, 104b, and so on (hereinafter collectively termed the WSDB 104). When there is a change in the number of secondary systems inside the geographical region managed by the GLDB 102 itself, the GLDB 102 recalculates the allocated transmit power for the secondary systems, or alternatively, adjusts the interference avoidance margin on the basis of the variation in the number of secondary systems.

The WSDB 104 includes a function of acquiring information indicating the transmit power calculation result from the GLDB 102, and signaling parameters for specifying the allocated transmit power of each secondary system to the master device of the relevant secondary system. In addition, the WSDB 104 also includes a function of communicating with other entities that may include the GLDB 102, and a function of communicating with the master WSD 20. The WSDB 104 may also receive information indicating the transmit power calculation result from the GLDB 102 directly, or acquire such information via another WSDB. As an example, the GLDB 102 may be a server administered by an official or public organization, whereas the WSDB may be server administered by a for-profit or non-profit enterprise.

The GLDB 102 periodically (or non-periodically) calculates (recalculates/adjusts) the transmit power that should be allocated to the secondary systems on the basis of primary system information and secondary system information reported by the WSDB 104. Subsequently, the GLDB 102 transmits the power allocation-related information discussed earlier that indicates the calculation result to the WSDB 104. The power allocation-related information at least includes a parameter specifying the calculated interference avoidance margin. The type of the parameter may be an arbitrary type, such as those described with regards to the signaling unit 136 of the communication control apparatus 100.

In the first example, the power allocation-related information is associated with individual secondary systems (or master WSDs), and may include a system ID or a device ID, for example. In this case, the WSDB 104 may signal, in response to a request from the master WSD 20, information corresponding to the ID of the request source to the master WSD 20. In the second example, the power allocation-related information is associated with location (and device attributes such as antenna height). For example, the geographical region managed by the GLDB 102 is segmented into a grid, and identification information is assigned to individual segments. Subsequently, the power allocation-related information is provided to the WSDB 104 in the form of a table mapping pairs of a segment and a device attribute (antenna height, for example) with a margin value. In this case, the WSDB 104 may signal, in response to a request from the master WSD 20, the margin value mapped to the pair of the segment where the requesting device is positioned and the attribute. In either example, the WSDB 104 may also signal the nominal transmit power and the interference avoidance margin to each master WSD 20. Alternatively, on the basis of the power allocation-related information, the WSDB 104 may also calculate the allocated transmit power of individual master WSDs 20 from the nominal transmit power and the interference avoidance margin (base value and adjustment), and signal parameters for specifying the calculated allocated transmit power to individual master WSDs 20. Additionally, the WSDB 104 may also signal to the master WSD 20 parameters enabling the master WSD 20 to calculate the nominal transmit power.

The master WSD 20 corresponds to the wireless communication apparatus 20 described using FIG. 10. The master WSD 20 includes a function of communicating with the WSDB 104 having power allocation-related information that specifies the allocated transmit power for the secondary system that the master WSD 20 itself operates and manages. The master WSD 20 receives the signaling of parameters for specifying the allocated transmit power from the connected WSDB 104, and controls wireless communication between the master WSD 20 and one or more slave WSDs in accordance with the allocated transmit power specified using the received parameters.

7. Application Examples

The technology of the present disclosure is applicable to various products. For example, the communication control apparatuses 100, 102, and 104 may be realized as any type of data server such as a tower server, a rack server, and a blade server. The communication control apparatuses 100, 102, and 104 may be a control module (such as an integrated circuit module fabricated on a single die, and a card or a blade that is inserted into a slot of a blade server) mounted on a server.

As another example, the wireless communication apparatus 20 may also be realized as an evolved Node B (eNB) of any type, such as a macro eNB, a pico eNB, or a home eNB. Conversely, the wireless communication apparatus 20 may also be realized as another type of base station, such as a NodeB or a base transceiver station (BTS).

For example, the wireless communication apparatus 20 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The wireless communication apparatus 20 may also be realized as a terminal (that is also referred to as a machine type communication (MTC) terminal) that performs machine-to-machine (M2M) communication. Furthermore, the wireless communication apparatus 20 may be a radio communication module (such as an integrated circuit module fabricated on a single die) mounted on each of the terminals.

7-1. Application Example Related to Networking Control Node

Figure 12:
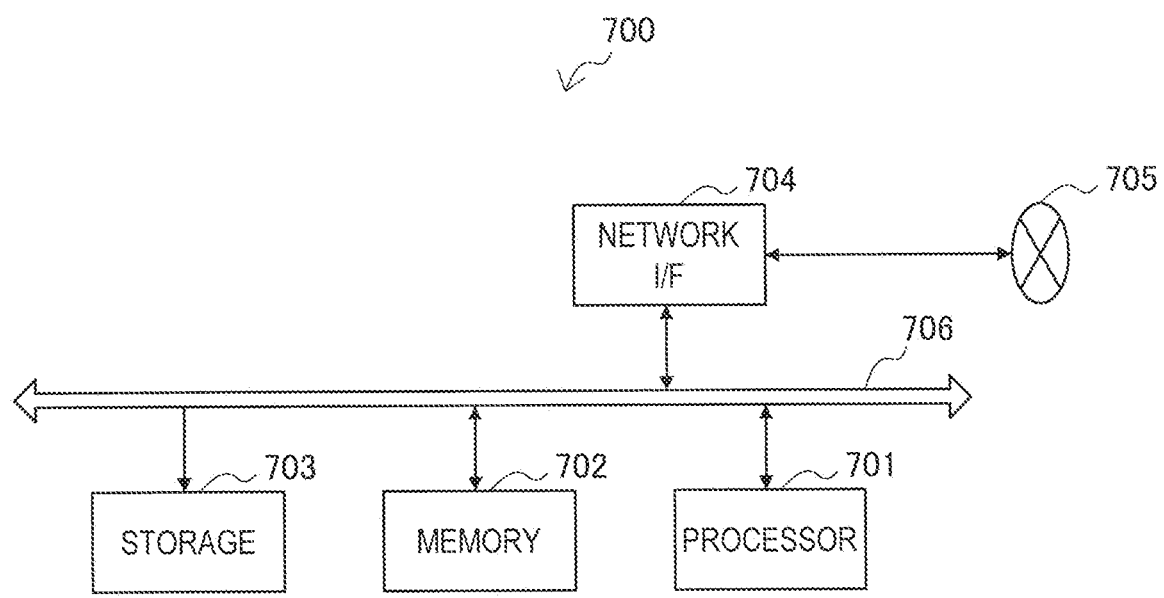
FIG. 12 is a block diagram illustrating an example of a schematic configuration of a GLDB.

FIG. 12 is a block diagram illustrating an example of the schematic configuration of a GLDB 700 to which the technology of the present disclosure may be applied. The GLDB 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes a random access memory (RAM) and a read only memory (ROM), and stores a program that is executed by the processor 701 and data. The storage 703 may include a storage medium such as a semiconductor memory and a hard disk.

The network interface 704 is a wired communication interface for connecting the GLDB 700 to a wired communication network 705. The wired communication network 705 may be a core network such as an evolved packet core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the GLDB 700 illustrated in FIG. 12, the control unit 130 described using FIG. 6 may be implemented in the processor 701. For example, the processor 701 functions as the determination unit 132, the calculation unit 134, and the signaling unit 136, and thereby is able to track variation in the number of secondary systems within the geographical region managed by the GLDB 700 to allocate transmit power to each secondary system promptly while also preventing harmful interference on the primary system.

7-2. Application Examples Related to Base Station

Figure 13:
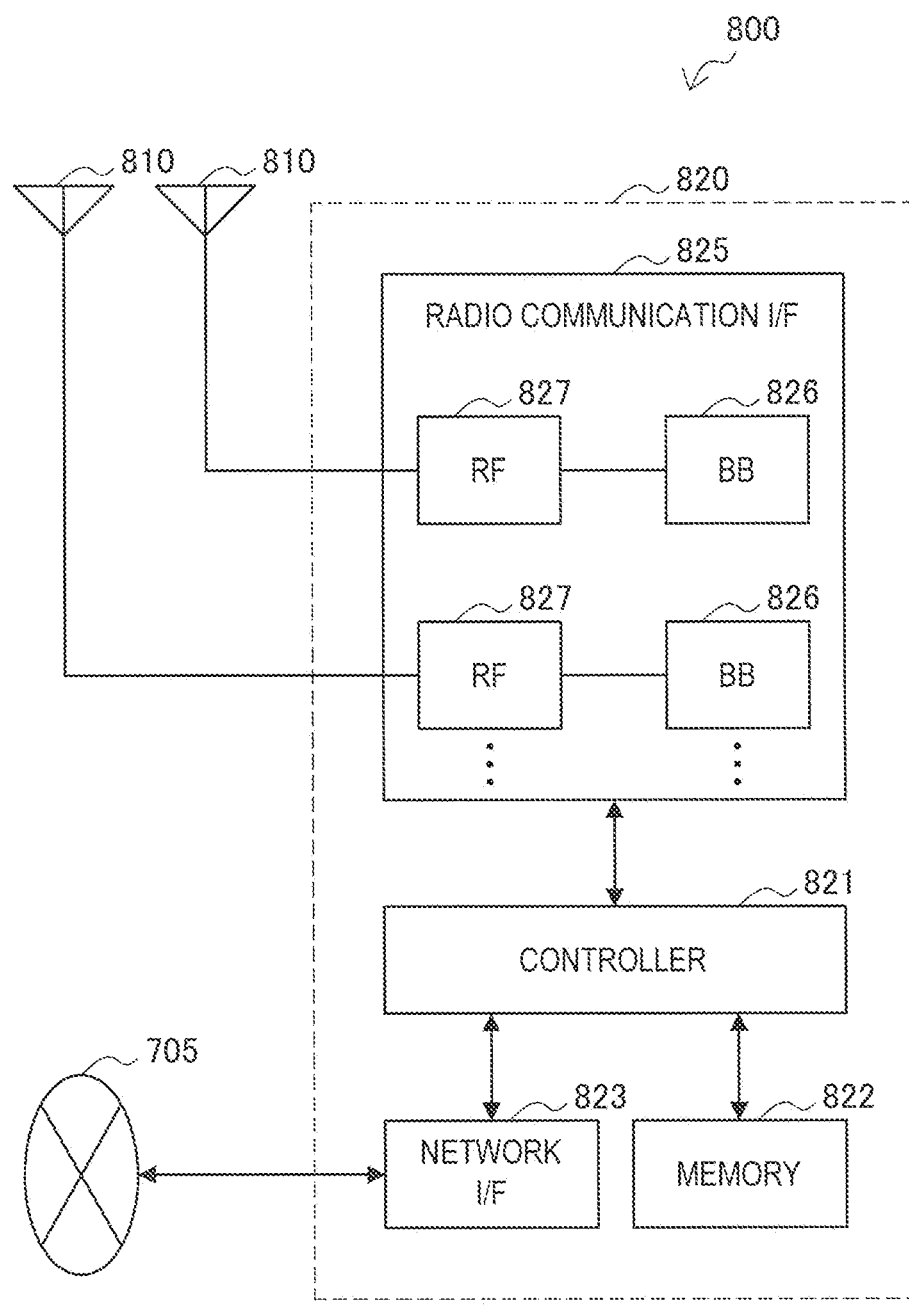
FIG. 13 is a block diagram illustrating an example of a schematic configuration of an eNB.

FIG. 13 is a block diagram illustrating an example of the schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 13. For example, the multiple antennas 810 may be compatible with multiple frequency bands used by the eNB 800, respectively. Note that FIG. 13 illustrates the example in which the eNB 800 includes the multiple antennas 810, but the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes a RAM and a ROM, and stores a program that is executed by the controller 821, and various types of control data (such as a terminal list, transmission power data, and scheduling data).

The network interface 823 is a communication interface for connecting the base station apparatus 820 to the wired communication network 705. The controller 891 may communicate with the GLDB 700 via the network interface 823.

The radio communication interface 825 supports any cellular communication scheme such as long term evolution (LTE) and LTE-Advanced, and provides radio connection to a terminal (a slave device) positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 13. For example, the multiple BB processors 826 may be compatible with multiple frequency bands used by the eNB 800. The radio communication interface 825 may include the multiple RF circuits 827, as illustrated in FIG. 13. For example, the multiple RF circuits 827 may be compatible with multiple antenna elements, respectively. Note that FIG. 13 illustrates the example in which the radio communication interface 825 includes the multiple BB processors 826 and the multiple RF circuits 827, but the radio communication interface 825 may also include a single BB processor 826 or a single RF circuit 827.

In the eNB 800 illustrated in FIG. 13, the communication control unit 240 described using FIG. 10 may be implemented in the radio communication interface 825. Also, at least some of the functions may also be implemented in the controller 821. For example, by executing wireless communication with slave devices using transmit power allocated by the communication control apparatus 100, the eNB 800 is able to initiate the management and operation of a secondary system promptly while also preventing harmful interference on the primary system.

Second Application Example

Figure 14:
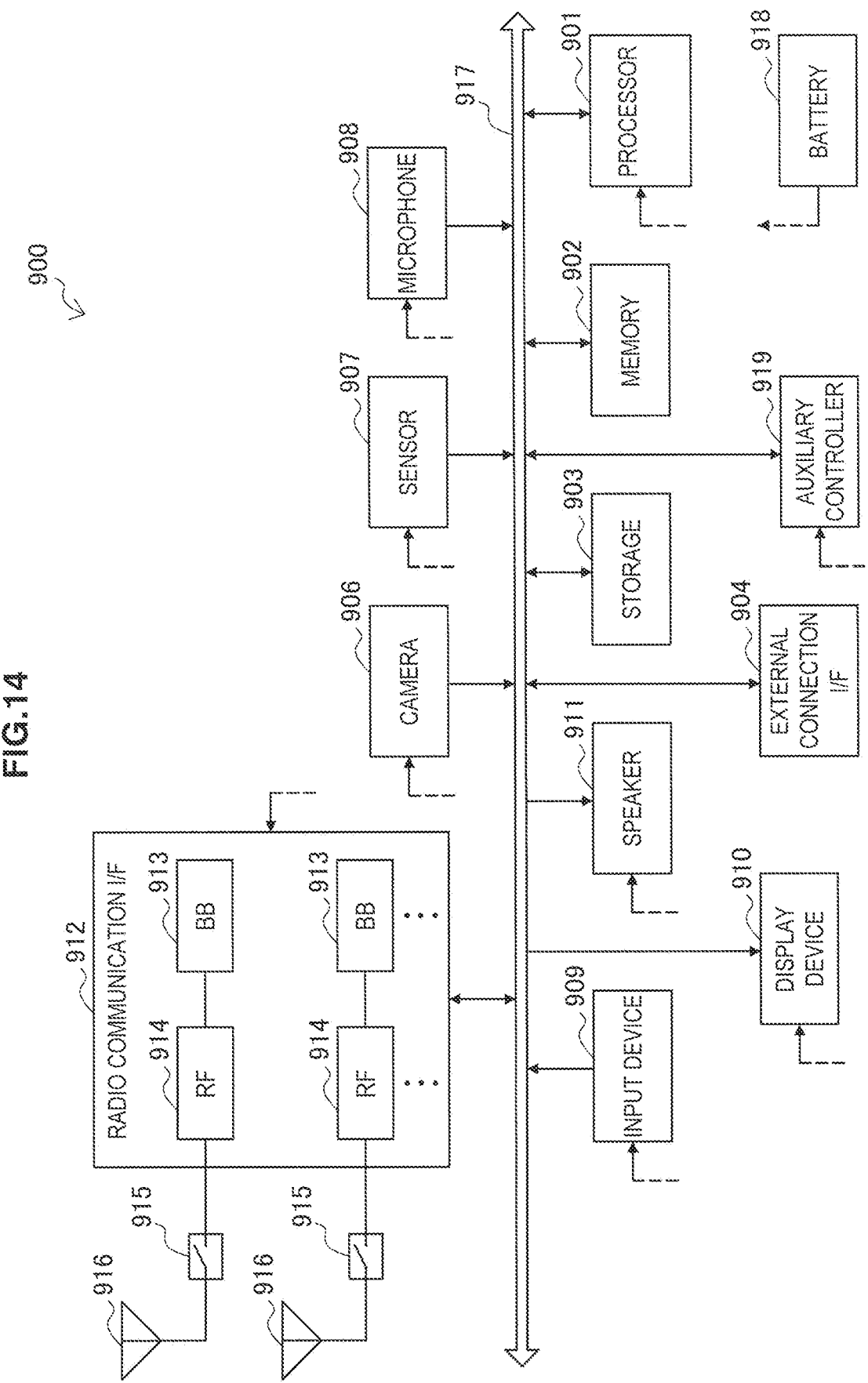
FIG. 14 is a block diagram illustrating an example of a schematic configuration of a smartphone.

FIG. 14 is a block diagram illustrating an example of the schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-A, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 14. Note that FIG. 14 illustrates the example in which the radio communication interface 912 includes the multiple BB processors 913 and the multiple RF circuits 914, but the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 14. Note that FIG. 14 illustrates the example in which the smartphone 900 includes the multiple antennas 916, but the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 14 via feeder lines, which are partially shown as dashed lines in the figure. The auxiliary controller 919 operates a minimum necessary function of the smartphone 900, for example, in a sleep mode.

The smartphone 900 illustrated in FIG. 14 may also operate as the master device of a secondary system. In this case, the communication control unit 240 described using FIG. 10 may be implemented in the radio communication interface 912. Also, at least some of these functions may also be implemented in the processor 901 or the auxiliary controller 919. For example, by executing wireless communication with slave devices using transmit power allocated by the communication control apparatus 100, the smartphone 900 is able to initiate the management and operation of a secondary system promptly while also preventing harmful interference on the primary system. Additionally, the smartphone 900 may also operate as a slave device of a secondary system.

Third Application Example

FIG. 15 is a block diagram illustrating an example of the schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sound of the navigation function or the content that is reproduced.

The radio communication interface 933 supports any cellular communication scheme such as LET and LTE, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 15. Note that FIG. 15 illustrates the example in which the radio communication interface 933 includes the multiple BB processors 934 and the multiple RF circuits 935, but the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 15. Note that FIG. 15 illustrates the example in which the car navigation apparatus 920 includes the multiple antennas 937, but the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 15 via feeder lines that are partially shown as dashed lines in the figure. The battery 938 accumulates power supplied form the vehicle.

The car navigation apparatus 920 illustrated in FIG. 15 may also operate as the master device of a secondary system. In this case, the communication control unit 240 described using FIG. 10 may be implemented in the radio communication interface 933. Also, at least some of these functions may also be implemented in the processor 921. For example, by executing wireless communication with slave devices using transmit power allocated by the communication control apparatus 100, the car navigation apparatus 920 is able to initiate the management and operation of a secondary system promptly while also preventing harmful interference on the primary system. Additionally, the car navigation apparatus 920 may also operate as a slave device of a secondary system.

The technology of the present disclosure may also be realized as an in-vehicle system (or a vehicle) 940 including one or more blocks of the car navigation apparatus 920, the in-vehicle network 941, and a vehicle-side module 942. The vehicle-side module 942 generates vehicle data such as vehicle speed, engine speed, and trouble information, and outputs the generated data to the in-vehicle network 941.

8. Conclusion

The foregoing thus describes several embodiments of technology according to the present disclosure in detail using FIGS. 1 to 15. According to the foregoing embodiments, in an apparatus that calculates the transmit power that should be allocated to one or more secondary systems that secondarily use frequency channels protected for a primary system, when the number of secondary systems changes, whether to recalculate the transmit power or adjust a previously calculated transmit power on the basis of the variation in the number of secondary systems is determined dynamically in accordance with a condition dependent on the number of secondary systems. Consequently, it is possible to achieve both prevention of harmful interference and promptness of power allocation. In addition, it is possible to resolve adverse effects, such as the production of harmful interference caused by power allocation not being updated in a timely manner. Consequently, the utilization efficiency of radio resources is improved. Note that although this specification describes an example in which primarily the recalculation and adjustment of transmit power is conducted periodically, the technology according to the present disclosure is not limited to such an example. For example, the transmit power may also be adjusted with a small calculation cost in accordance with the technology of the present disclosure when a trigger is detected, such as a request from the primary system or a secondary system, or a change in some kind of input condition.

For example, the transmit power is recalculated when the changed number of secondary systems falls below a threshold. On the other hand, adjustment of a previously calculated transmit power is executed when the changed number of secondary systems exceeds a threshold. Consequently, when many secondary systems are present, and there is a possibility that the calculation of power allocation may not finish within an allowed time, only adjustment of the transmit power is executed with a simple algorithm. Consequently, it is possible to prevent the loss of communication opportunities in a secondary system caused by a delay in the allocation of transmit power, while also maintaining the protection of the primary system.

According to a power calculation model given as an example, the transmit power to allocate to each secondary system is calculated by using a nominal transmit power of the relevant secondary system and an interference avoidance margin. In this model, the adjustment of transmit power is executed by adjusting the interference avoidance margin on the basis of the variation in the number of secondary systems. Consequently, the transmit power may be adjusted with a small calculation cost, simply by monitoring changes in the number of secondary systems.

Note that the series of control processing by the respective apparatuses described herein may be implemented by using any of software, hardware, and a combination of software and hardware. Programs constituting the software are previously stored in, for example, a recording medium (a non-transitory medium) provided in the inside or the outside of the respective apparatuses. And the respective programs are, for example, read into a random access memory (RAM) during execution and executed by the processor such as the CPU.

Further, the processes described using the flowcharts in the present description may not necessarily be executed in the order indicated by the flowchart. Some process steps may be executed in parallel. Further, additional process steps may be employed, and some process steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication control apparatus including:

a calculation unit configured to calculate a transmit power to be allocated to one or more secondary systems that secondarily use frequency channels protected for a primary system; and a determination unit configured to, when the number of secondary systems changes, determine, according to a condition dependent on the number of secondary systems, whether to cause the calculation unit to recalculate the transmit power or adjust a previously calculated transmit power on the basis of the variation in the number of secondary systems.

(2)

The communication control apparatus according to (1), wherein the determination unit causes the calculation unit to recalculate the transmit power in a case of the changed number of secondary systems falling below a threshold value, and causes the calculation unit to adjust the previously calculated transmit power in a case of the changed number of secondary systems exceeding the threshold value.

(3)

The communication control apparatus according to (2), wherein the threshold value is configured in advance in a manner that an estimated calculation time dependent on the number of secondary systems does not exceed an allowed calculation time.

(4)

The communication control apparatus according to (2), wherein the threshold value is configured dynamically in a manner that an estimated calculation time dependent on the number of secondary systems does not exceed an allowed calculation time.

(5)

The communication control apparatus according to any one of (1) to (4), wherein the variation in the number of secondary systems is calculated on a basis of the number of secondary systems at a point in time when the transmit power was last recalculated.

(6)

The communication control apparatus according to any one of (1) to (4), wherein the variation in the number of secondary systems is calculated on a basis of the number of secondary systems at an immediately previous point in time when the transmit power was recalculated or adjusted.

(7)

The communication control apparatus according to any one of (1) to (6), wherein the transmit power to be allocated to each secondary system includes a nominal transmit power of the relevant secondary system and a margin for interference avoidance, and the calculation unit adjusts the transmit power by adjusting the margin for interference avoidance on the basis of the variation in the number of secondary systems.

(8)

The communication control apparatus according to (7), wherein the calculation unit calculates an adjustment of the margin for interference avoidance by estimating a variation in an interference quantity on a basis of the variation in the number of secondary systems.

(9)

The communication control apparatus according to (8), wherein the calculation unit estimates the variation in the interference quantity by using a table defining mappings between the variation in the number of secondary systems and the variation in the interference quantity.

(10)

The communication control apparatus according to (8), wherein the calculation unit estimates the variation in the interference quantity on a basis of an assumption that the number of secondary systems and the interference quantity are proportional.

(11)

The communication control apparatus according to any one of (7) to (10), further including a signaling unit configured to signal an adjustment of the margin for interference avoidance calculated by the calculation unit to existing secondary systems.

(12)

The communication control apparatus according to (11), wherein the signaling unit signals a base value and the adjustment of the margin for interference avoidance to new secondary systems.

(13)

The communication control apparatus according to (12), wherein depending on the load on the calculation unit, the signaling unit causes each relevant secondary system itself to calculate the nominal transmit power by signaling calculation parameters to the new secondary systems.

(14)

The communication control apparatus according to any one of (1) to (13), wherein the communication control apparatus has an authority to allocate transmit power to the one or more secondary systems within a first geographical region, and the calculation unit, in a case in which presence of secondary systems within a second geographical region neighboring the first geographical region should be considered in transmit power allocation, acquires information indicating a number of secondary systems within the second geographical region that should be considered from another apparatus having authority for the second geographical region.

(15)

The communication control apparatus according to any one of (11) to (13), wherein the transmit power to be allocated to each secondary system additionally includes a margin for reducing signaling overhead, and the signaling unit refrains from signaling the adjustment of the margin for interference avoidance to the existing secondary systems in a case of the adjustment of the margin for interference avoidance falling below the margin for reducing signaling overhead included in an already-allocated transmit power.

(16)

The communication control apparatus according to any one of (1) to (15), wherein the calculation unit reduces the frequency of signaling to each secondary system by adjusting the transmit power by setting the variation in the number of secondary systems to a greater-than-actual virtual value.

(17)

A communication control method including:

in a processor, calculating a transmit power to be allocated to one or more secondary systems that secondarily use frequency channels protected for a primary system; and when the number of secondary systems changes, determining, according to a condition dependent on the number of secondary systems, whether to cause the processor to recalculate the transmit power or adjust a previously calculated transmit power on the basis of the variation in the number of secondary systems.

(18)

A wireless communication apparatus including:

a communication unit configured to communicate with a communication control apparatus that, when there is a change in the number of secondary systems operated and managed by secondarily using frequency channels protected for a primary system, recalculates a transmit power to be allocated to each secondary system or adjusts a previously calculated transmit power on the basis of the variation in the number of secondary systems, according to a condition depending on the number of secondary systems; and a communication control unit configured to control wireless communication between the wireless communication apparatus and one or more terminal apparatuses according to the allocation of transmit power indicated by the communication control apparatus via the communication unit.

Additionally, the present technology may also be configured as below.

(1)

A communication control apparatus including:

a calculation unit configured to calculate a transmit power to be allocated, including a nominal transmit power and a margin for interference avoidance, for one or more secondary systems that secondarily use frequency channels protected for a primary system; and a determination unit configured to determine a variation in a number of secondary systems, and cause the calculation unit to adjust the margin for interference avoidance on a basis of the determined variation.

(2)

The communication control apparatus according to (1), wherein the determination unit determines, according to a condition dependent on the number of secondary systems, whether to cause the calculation unit to recalculate the transmit power or adjust a previously calculated transmit power by adjusting the margin for interference avoidance on a basis of the variation.

(3)

The communication control apparatus according to (2), wherein the determination unit causes the calculation unit to recalculate the transmit power in a case of the changed number of secondary systems falling below a threshold value, and causes the calculation unit to adjust the previously calculated transmit power in a case of the changed number of secondary systems exceeding the threshold value.

(4)

The communication control apparatus according to (3), wherein the threshold value is configured in advance in a manner that an estimated calculation time dependent on the number of secondary systems does not exceed an allowed calculation time.

(5)

The communication control apparatus according to (3), wherein the threshold value is configured dynamically in a manner that an estimated calculation time dependent on the number of secondary systems does not exceed an allowed calculation time.

(6)

The communication control apparatus according to any one of (2) to (5), wherein the variation in the number of secondary systems is calculated on a basis of the number of secondary systems at a point in time when the transmit power was last recalculated.

(7)

The communication control apparatus according to any one of (2) to (5), wherein the variation in the number of secondary systems is calculated on a basis of the number of secondary systems at an immediately previous point in time when the transmit power was recalculated or adjusted.

(8)

The communication control apparatus according to any one of (1) to (7), wherein the number of secondary systems is based on one or both of a number of master devices and a number of slave devices in the secondary systems.

(9)

The communication control apparatus according to (8), wherein the numbers of devices are calculated by including weights depending on a device configuration.

(10)

The communication control apparatus according to any one of (2) to (7), wherein the determination unit additionally determines whether to cause the calculation unit to recalculate the transmit power or adjust the previously calculated transmit power according to a condition dependent on at least one from among a reference point, a frequency channel to be secondarily used, a device antenna height, and an interference level from other systems.

(11)

The communication control apparatus according to any one of (1) to (10), wherein the calculation unit calculates an adjustment of the margin for interference avoidance by estimating a variation in an interference quantity on a basis of the variation in the number of secondary systems.

(12)

The communication control apparatus according to (11), wherein the calculation unit estimates the variation in the interference quantity by using a table defining mappings between the variation in the number of secondary systems and the variation in the interference quantity.

(13)

The communication control apparatus according to (11), wherein the calculation unit estimates the variation in the interference quantity on a basis of an assumption that the number of secondary systems and the interference quantity are proportional.

(14)

The communication control apparatus according to any one of (1) to (13), wherein the communication control apparatus has an authority to allocate transmit power to the one or more secondary systems within a first geographical region, and the calculation unit, in a case in which presence of secondary systems within a second geographical region neighboring the first geographical region should be considered in transmit power allocation, acquires information indicating a number of secondary systems within the second geographical region that should be considered from another apparatus having authority for the second geographical region.

(15)

The communication control apparatus according to any one of (1) to (14), wherein the calculation unit adjusts the margin for interference avoidance by setting the variation in the number of secondary systems to a greater-than-actual virtual value.

(16)

The communication control apparatus according to any one of (1) to (15), further including a signaling unit configured to signal an adjustment of the margin for interference avoidance calculated by the calculation unit for the secondary systems.

(17)

The communication control apparatus according to (16), wherein the allocated transmit power for each secondary system additionally includes a margin for reducing signaling overhead, and the signaling unit refrains from signaling the adjustment of the margin for interference avoidance in a case of the adjustment of the margin for interference avoidance falling below the margin for reducing signaling overhead included in an already-allocated transmit power.

(18)

A communication control method including:

in a processor, calculating a transmit power to be allocated, including a nominal transmit power and a margin for interference avoidance, for one or more secondary systems that secondarily use frequency channels protected for a primary system; and determining a variation in a number of secondary systems, and causing the processor to adjust the margin for interference avoidance on a basis of the determined variation.

(19)

A communication control apparatus including:

a communication unit configured to communicate with a master device of one or more secondary systems that secondarily use frequency channels protected for a primary system; and a control unit configured to signal, on a basis of information acquired from a data server that calculates an allocated transmit power for the secondary systems including a nominal transmit power and a margin for interference avoidance adjusted on a basis of variation in a number of secondary systems, parameters for specifying the allocated transmit power to the master device via the communication unit.

(20)

The communication control apparatus according to (19), wherein the control unit calculates the allocated transmit power for each master device from the nominal transmit power as well as a base value and an adjustment of the margin for interference avoidance, and signals the parameters for specifying the calculated allocated transmit power to the master device.

(21)

The communication control apparatus according to (19), wherein the parameters include parameters for calculating the nominal transmit power.

(22)

A communication control method of a communication control apparatus that communicates with a master device of one or more secondary systems that secondarily use frequency channels protected for a primary system, the communication control method including signaling, on a basis of information acquired from a data server that calculates an allocated transmit power for the secondary systems including a nominal transmit power and a margin for interference avoidance adjusted on a basis of variation in a number of secondary systems, parameters for specifying the allocated transmit power to the master device.

(23)

A wireless communication apparatus that operates and manages a secondary system that secondarily uses a frequency channel protected for a primary system, the wireless communication apparatus including:

a communication unit configured to receive signaling of parameters for specifying an allocated transmit power based on information acquired from a data server that calculates the allocated transmit power for the secondary system including a nominal transmit power and a margin for interference avoidance adjusted on a basis of variation in a number of secondary systems; and a communication control unit configured to control wireless communication between the wireless communication apparatus and one or more terminal apparatuses according to the allocated transmit power specified using the parameters.

(24)

A communication control method of a wireless communication apparatus that operates and manages a secondary system that secondarily uses a frequency channel protected for a primary system, the communication control method including:

receiving signaling of parameters for specifying an allocated transmit power based on information acquired from a data server that calculates the allocated transmit power for the secondary system including a nominal transmit power and a margin for interference avoidance adjusted on a basis of variation in a number of secondary systems; and controlling wireless communication between the wireless communication apparatus and one or more terminal apparatuses according to the allocated transmit power specified using the parameters.

REFERENCE SIGNS LIST 1, 2 communication control system
10 primary transceiver
100 communication control apparatus (GLDB)
102 communication control apparatus (GLDB)
104 communication control apparatus (WSDB)
110 communication unit
120 storage unit
130 control unit
132 determination unit
134 calculation unit
136 signaling unit
20 wireless communication apparatus (master WSD)
210 wireless communication unit
220 network communication unit
230 storage unit
240 communication control unit

The invention claimed is:

1. A communication control apparatus comprising:
circuitry configured to:
allocate a transmit power for one or more secondary systems that secondarily use frequency channels allocated to a primary system;
monitor activation requests received from the one or more secondary systems;
determine a variation in a number of one or more master devices which belong to a secondary system, wherein the master devices are configured to operate according to a time-division scheme and communicate with slave devices that are configured to operate the same scheme;
estimate an interference level from the secondary systems to the primary system when the variation in the number of the one or more master devices is greater than a threshold value; and
signal information indicating that an activation request is allowed to the one or more secondary systems.

2. The communication control apparatus according to claim 1, wherein the circuitry is further configured to periodically calculate the transmit power for the one or more secondary systems.

3. The communication control apparatus according to claim 1, wherein the circuitry is further configured to calculate the transmit power for the one or more secondary systems based on information reported by the one or more secondary systems.

4. The communication control apparatus according to claim 1, wherein
the circuitry is further configured to:
determine a method to adjust the allocated transmit power according to a condition dependent on the number of one or more secondary systems;
determine whether to recalculate a previously calculated transmit power or adjust the previously calculated transmit power by adjusting a margin for interference avoidance based on the variation; and
adjust the allocated transmit power based on the determined method.

5. The communication control apparatus according to claim 4, wherein the circuitry is further configured to recalculate the previously calculated transmit power in a case of variation in a number of one or more secondary systems falling below a threshold value, and adjust the previously calculated transmit power in another case of the variation in the number of one or more secondary systems exceeding the threshold value.

6. The communication control apparatus according to claim 5, wherein the threshold value is configured in advance in a manner that an estimated calculation time dependent on the number of one or more secondary systems does not exceed an allowed calculation time.

7. The communication control apparatus according to claim 5, wherein the threshold value is configured dynamically in a manner that an estimated calculation time dependent on the number of one or more secondary systems does not exceed an allowed calculation time.

8. A communication method comprising:
allocating, by circuitry, a transmit power for one or more secondary systems that secondarily use frequency channels allocated to a primary system;
monitoring activation requests received from the one or more secondary systems;
determining a variation in a number of one or more master devices which belong to a secondary system, wherein the master devices are configured to operate according to a time-division scheme and communicate with slave devices that are configured to operate the same scheme;
estimating an interference level from the secondary systems to the primary system when the variation in the number of the one or more master devices is greater than a threshold value; and
signaling information indicating that an activation request is allowed to the one or more secondary systems.

9. The communication method according to claim 8, further comprising:
periodically calculating the transmit power for the one or more secondary systems.

10. The communication method according to claim 8, further comprising:
calculating the transmit power for the one or more secondary systems based on information reported by the one or more secondary systems.

11. The communication method according to claim 8, further comprising:
determining a method to adjust the allocated transmit power according to a condition dependent on the number of one or more secondary systems;
determining whether to recalculate a previously calculated transmit power or adjust the previously calculated transmit power by adjusting a margin for interference avoidance based on the variation; and
adjusting the allocated transmit power based on the determined method.

12. The communication method according to claim 11, further comprising:
recalculating the previously calculated transmit power in a case of variation in a number of one or more secondary systems falling below a threshold value; and
adjusting the previously calculated transmit power in another case of the variation in the number of one or more secondary systems exceeding the threshold value.

13. The communication method according to claim 12, wherein the threshold value is configured in advance in a manner that an estimated calculation time dependent on the number of one or more secondary systems does not exceed an allowed calculation time.

14. The communication method according to claim 12, wherein the threshold value is configured dynamically in a manner that an estimated calculation time dependent on the number of one or more secondary systems does not exceed an allowed calculation time.

15. A non-transitory computer-readable storage medium storing executable instructions which, when executed by circuitry, cause the circuitry to perform a communication method, the method comprising:
    allocating a transmit power for one or more secondary systems that secondarily use frequency channels allocated to a primary system;
    monitoring activation requests received from the one or more secondary systems;
    determining a variation in a number of one or more master devices which belong to a secondary system, wherein the master devices are configured to operate according to a time-division scheme and communicate with slave devices that are configured to operate the same scheme;
    estimating an interference level from the secondary systems to the primary system when the variation in the number of the one or more master devices is greater than a threshold value; and
    signaling information indicating that an activation request is allowed to the one or more secondary systems.

16. The non-transitory computer-readable storage medium according to claim 15, wherein the method further comprises:
    periodically calculating the transmit power for the one or more secondary systems.

17. The non-transitory computer-readable storage medium according to claim 15, wherein the method further comprises:
    calculating the transmit power for the one or more secondary systems based on information reported by the one or more secondary systems.

18. The non-transitory computer-readable storage medium according to claim 15, wherein the method further comprises:
    determining a method to adjust the allocated transmit power according to a condition dependent on the number of one or more secondary systems;
    determining whether to recalculate a previously calculated transmit power or adjust the previously calculated transmit power by adjusting a margin for interference avoidance based on the variation; and
    adjusting the allocated transmit power based on the determined method.

19. The non-transitory computer-readable storage medium according to claim 18, wherein the method further comprises:
    recalculating the previously calculated transmit power in a case of variation in a number of one or more secondary systems falling below a threshold value; and
    adjusting the previously calculated transmit power in another case of the variation in the number of one or more secondary systems exceeding the threshold value.

20. The non-transitory computer-readable storage medium according to claim 19, wherein the threshold value is configured in advance in a manner that an estimated calculation time dependent on the number of one or more secondary systems does not exceed an allowed calculation time.

21. The non-transitory computer-readable storage medium according to claim 19, wherein the threshold value is configured dynamically in a manner that an estimated calculation time dependent on the number of one or more secondary systems does not exceed an allowed calculation time.

* * * * *